US012206148B2

(12) United States Patent
Wu et al.

(10) Patent No.: US 12,206,148 B2
(45) Date of Patent: Jan. 21, 2025

(54) FILTER DEVICE AND EQUIVALENT FILTER CIRCUIT THEREOF

(71) Applicant: NATIONAL TAIWAN UNIVERSITY, Taipei (TW)

(72) Inventors: Tzong-Lin Wu, Taipei (TW); Hsu-Wei Liu, Taipei (TW); Chi-Hsuan Cheng, Taipei (TW); Po-Jui Li, Taipei (TW)

(73) Assignee: National Taiwan University, Taipei (TW)

( * ) Notice: Subject to any disclaimer, the term of this patent is extended or adjusted under 35 U.S.C. 154(b) by 493 days.

(21) Appl. No.: 17/643,656

(22) Filed: Dec. 10, 2021

(65) Prior Publication Data

US 2022/0216578 A1 Jul. 7, 2022

(30) Foreign Application Priority Data

Jan. 7, 2021 (TW) ................................ 110100676

(51) Int. Cl.
*H01P 1/203* (2006.01)
*H01P 1/20* (2006.01)
*H01P 3/08* (2006.01)

(52) U.S. Cl.
CPC ................ *H01P 1/203* (2013.01); *H01P 1/20* (2013.01); *H01P 1/20345* (2013.01); *H01P 1/20363* (2013.01); *H01P 3/081* (2013.01)

(58) Field of Classification Search
CPC ... H01P 1/20345; H01P 1/20363; H01P 1/203
USPC .......................................................... 333/204
See application file for complete search history.

(56) References Cited

U.S. PATENT DOCUMENTS 9,655,230 B2 5/2017 Wu et al.

FOREIGN PATENT DOCUMENTS

TW M385809 U1 8/2010
TW I552521 B 10/2016

*Primary Examiner* — Benny T Lee
(74) *Attorney, Agent, or Firm* — Rosenberg, Klein & Lee

(57) ABSTRACT

The invention discloses a filter device. The filter device comprises a substrate, at least one transmission conductor, and a reference conductor having a slotted structure. The substrate is provided at a first surface thereof with the transmission conductor, and provided at a second surface thereof with the reference conductor. The slotted structure comprises a frame portion, a slotted portion, and a hollow portion. The slotted portion surrounds the frame portion, and the hollow portion is formed in the frame portion. At least one impedance unit is configured on the frame portion. The equivalent filter circuit of the filter device is formed between the transmission conductor, the slotted structure, the reference conductor, and the impedance unit. Thereby, the equivalent filter circuit absorbs at least one noise at at least one specific frequency by the impedance unit to avoid the noise reflected to affect the transmission quality of signal.

30 Claims, 25 Drawing Sheets

FILTER DEVICE AND EQUIVALENT FILTER CIRCUIT THEREOF

This non-provisional application claims priority claim under 35 U.S.C. § 119(a) on Taiwan Patent Application No. 110100676 filed Jan. 7, 2021, the entire contents of which are incorporated herein by reference.

FIELD OF THE INVENTION

The present invention is related to a filter device and an equivalent filter circuit, particularly to a filter device and an equivalent filter circuit used for absorbing the electromagnetic noise.

BACKGROUND

In current electronic products, the requirements for data transmission rates are rising rapidly, such that the transmitting speed of signal of high-speed transmission interfaces (such as USB, HDMI, and Thunderbolt) are also faster and faster. However, when the signal passes through a discontinuous structure, for example, holes passed through multi-layered, blended signal trajectory, and the interface connector, it will easily generate noises, and therefore cause serious electromagnetic interference (EMI) or radio frequency interference (RFI). When the EMI or RFI occurs, the operation of the electrical elements within the electrical product will be affected.

The conventional filter is usually a reflective filter. The reflective filter can reflect the noise back to an original path (such as front circuit) to prevent the noise to interfere the circuit to be protected. However, the reflected common-mode signal may also be transmitted to other radiating elements, in which the problem of electromagnetic interference still exists in the communication system.

SUMMARY OF THE INVENTION

It is one objective of the present invention to provide an equivalent filter circuit, in which comprises at least one first equivalent transmission line model, at least one second equivalent transmission line model, and/or at least one third equivalent transmission line model. One or more impedance units are disposed between the first equivalent transmission line model, the second equivalent transmission line model, and/or the third equivalent transmission line model, and connected with the first equivalent transmission line model, the second equivalent transmission line model, and/or the third equivalent transmission line model in series, parallel or series-parallel. Thereby, the equivalent filter circuit can absorb at least one noise at at least one specific frequency by the impedance units.

It is other objective of the present invention to provide a filter device, in which includes a substrate, at least one transmission conductor, and a first reference conductor. The transmission conductor is configured on a first surface of the substrate, and the first reference conductor is configured on a second surface of the substrate. The first reference conductor comprises a slotted structure. The slotted structure comprises a frame portion, a slotted portion, and a hollow portion. The slotted portion surrounds the frame portion, and the hollow portion is form in the frame portion. One or more impedance units are disposed on the frame portion and/or the slotted portion so that the filter device can absorb at least one noise at at least one specific frequency by the impedance units.

It is another objective of the present invention to provide a filter device, in which a second reference conductor, based on the position of the transmission conductor, is disposed in the hollow portion of the slotted structure of the filter device. A capacitive coupling effect generated between the transmission conductor and the slotted structure can be increased by the configuration of the second reference conductor, so that the signal passing through the filter device can obtain a better impedance matching to achieve better signal quality.

For achieving the above objectives, the present invention provides an equivalent filter circuit, comprising: at least one first equivalent transmission line model, comprising: a first master transmission conductor, connected at the left end thereof to a signal input port, and connected at the right end thereof to a signal output port; and a first slave transmission conductor; at least one second equivalent transmission line model, comprising: a second master transmission conductor connected at the left and right ends thereof to a reference potential; and a second slave transmission conductor connected at the right end thereof to the right end of the first slave transmission conductor; and at least one first impedance unit connected between the left end of the first slave transmission conductor and the left end of the second slave transmission conductor in series.

In one embodiment of the present invention, wherein at least one second impedance unit is connected between the right end of the first slave transmission conductor and the right end of the second slave transmission conductor in series.

In one embodiment of the present invention, wherein the equivalent filter circuit comprises at least one third equivalent transmission line model, the least one third equivalent transmission line model comprises a third master transmission conductor and a third slave transmission conductor, the left end of the second master transmission conductor is connected to the reference potential via the third master transmission conductor, the third slave transmission conductor and the at least one first impedance unit are connected between the left end of the first slave transmission conductor and the left end of the second slave transmission conductor in series.

In one embodiment of the present invention, wherein at least one third impedance unit is connected between the left end of the first slave transmission conductor and the left end of the third slave transmission conductor in series.

In one embodiment of the present invention, wherein at least one second impedance unit is connected between the right end of the first slave transmission conductor and the right end of the second slave transmission conductor in series.

In one embodiment of the present invention, wherein at least one fourth impedance unit is connected between the right end of the first impedance unit and the left end of the second master transmission conductor, or the at least one fourth impedance unit is connected between the left end of the first impedance unit and the left end of the second master transmission conductor.

In one embodiment of the present invention, wherein at least one second impedance unit is connected between the right end of the first slave transmission conductor and the right end of the second slave transmission conductor in series, at least one fifth impedance unit is connected between the right end of the at least one second impedance unit and the reference potential, or the at least one fifth impedance unit is connected between the left end of the at least one second impedance unit and the reference potential.

In one embodiment of the present invention, wherein the equivalent filter circuit comprises at least one third equivalent transmission line model; the least one third equivalent transmission line model comprises a third master transmission conductor and a third slave transmission conductor; the left end of the second master transmission conductor is connected to the reference potential via the third master transmission conductor; at least one third impedance unit, the third slave transmission conductor, and the at least one first impedance unit are connected between the left end of the first slave transmission conductor and the left end of the second slave transmission conductor in series; at least one sixth impedance unit is connected between the right end of the third impedance unit and the reference potential, or the at least one sixth impedance unit is connected between the left end of the third impedance unit and the reference potential.

In one embodiment of the present invention, further comprising one or more fourth impedance units and comprising a plurality of the first impedance units; wherein each of the fourth impedance units is connected at one end thereof between two adjacent first impedance units, and connected at the other end thereof to the second master transmission conductor.

In one embodiment of the present invention, wherein a plurality of second impedance units are connected between the right end of the first slave transmission conductor and the right end of the second slave transmission conductor in series; the equivalent filter circuit further comprises one or more fifth impedance unit, each of the fifth impedance units is connected at one end thereof between two adjacent second impedance units, and connected at the other end thereof to the reference potential.

In one embodiment of the present invention, wherein the equivalent filter circuit comprises at least one third equivalent transmission line model; the least one third equivalent transmission line model comprises a third master transmission conductor and a third slave transmission conductor; the left end of the second master transmission conductor is connected to the reference potential via the third master transmission conductor; a plurality of third impedance units, the third slave transmission conductor, and the at least one first impedance unit are connected between the left end of the first slave transmission conductor and the left end of the second slave transmission conductor in series; the equivalent filter circuit further comprises one or more sixth impedance units, each of the sixth impedance units is connected at one end thereof between two adjacent third impedance units, and connected at the other end thereof to the reference potential.

In one embodiment of the present invention, wherein a plurality of second impedance units are connected between the right end of the first slave transmission conductor and the right end of the second slave transmission conductor in series; the equivalent filter circuit further comprises one or more fifth impedance unit, each of the fifth impedance units is connected at one end thereof between two adjacent second impedance units, and connected at the other end thereof to the reference potential.

In one embodiment of the present invention, wherein the first master transmission conductor and the first slave transmission conductor are coupled to generate a first characteristic impedance and a first electrical length; the second master transmission conductor and the second slave transmission conductor are coupled to generate a second characteristic impedance and a second electrical length; the third master transmission conductor and the third slave transmission conductor are coupled to generate a third characteristic impedance and a third electrical length; the first characteristic impedance, the second characteristic impedance, and the third characteristic impedance are of the same impedance value or the different impedance values; the first electrical length, the second electrical length, and the third electrical length are of the same electrical length or the different electrical lengths.

In one embodiment of the present invention, wherein the equivalent filter circuit comprises the two first equivalent transmission line models and the two second equivalent transmission line models; the left ends of the second slave transmission conductors of the two first equivalent transmission line models are connected together via the at least one corresponding first impedance unit, and the right ends of the second slave transmission conductors of the two first equivalent transmission line models are directly connected together.

In one embodiment of the present invention, wherein the first equivalent transmission line model or the second equivalent transmission line model is a microstrip line, a slotted line, an artificial transmission line, a modified-T circuit line, or other transmission line structure capable of transmitting signals.

In one embodiment of the present invention, wherein the at least one first impedance unit is at least one resistor, at least one inductor, at least one capacitor, or a series-parallel combination of the at least one resistor, the at least one inductor, and the at least one capacitor.

The present invention further comprises an equivalent filter circuit, comprising: at least one first equivalent transmission line model, comprising: a first master transmission conductor, connected at the left end thereof to a signal input port, and connected at the right end thereof to a signal output port; and a first slave transmission conductor; and at least one second equivalent transmission line model, comprising: a second master transmission conductor connected at the left and right ends thereof to a reference potential; and a second slave transmission conductor, connected at the left end thereof to the left end of the first slave transmission conductor, and connected at the right end thereof to the right end of the first slave transmission conductor; wherein the at least one second equivalent transmission line model is connected to a first impedance unit in parallel via the left end of the second master transmission conductor and the left end of the second slave transmission conductor.

In one embodiment of the present invention, wherein the at least one second equivalent transmission line model is connected to a second impedance unit in parallel via the right end of the second master transmission conductor and the right end of the second slave transmission conductor.

In one embodiment of the present invention, wherein the equivalent filter circuit comprises at least one third equivalent transmission line model, the least one third equivalent transmission line model comprises a third master transmission conductor and a third slave transmission conductor; the left end of the second master transmission conductor is connected to the reference potential via the third master transmission conductor; the third slave transmission conductor are connected between the left end of the first slave transmission conductor and the left end of the second slave transmission conductor in series.

In one embodiment of the present invention, wherein the at least one third equivalent transmission line model is connected to the first impedance unit in parallel via the right end of the third master transmission conductor and the right end of the third slave transmission conductor, and the at least one third equivalent transmission line model is connected to a third impedance unit in parallel via the left end of the third master transmission conductor and the left end of the third slave transmission conductor.

In one embodiment of the present invention, wherein the at least one second equivalent transmission line model is connected to a second impedance unit in parallel via the right end of the second master transmission conductor and the right end of the second slave transmission conductor.

The present invention further comprises a filter device, comprising: a substrate; at least one transmission conductor configured on a first surface of the substrate; and a first reference conductor, configured on a second surface of the substrate, and comprising a slotted structure, the slotted structure comprising: a frame portion; a slotted portion surrounding the frame portion; and a hollow portion formed in the frame portion; wherein at least one first impedance unit is connected to the frame portion.

In one embodiment of the present invention, wherein the frame portion is a quadrilateral frame and comprises a first side, a second side, a third side, and a fourth side; the first side is corresponding to the third side, and the second side is corresponding to the fourth side, the at least one transmission conductor is projectively across the first side and the third side of the frame portion.

In one embodiment of the present invention, further comprising at least one second impedance unit, wherein the at least one first impedance unit is disposed on the first side of the frame portion based on the position of the at least one transmission conductor, and the at least one second impedance unit is disposed on the third side of the frame portion based on the position of the at least one transmission conductor.

In one embodiment of the present invention, further comprising at least one third impedance unit, wherein the at least one third impedance unit is configured on the second side or the fourth side of the frame portion.

In one embodiment of the present invention, further comprising at least one third impedance unit, wherein the at least one third impedance unit is disposed on the second side or the fourth side of the frame portion.

In one embodiment of the present invention, further comprising at least one fourth impedance unit, wherein the at least one fourth impedance unit is disposed in the slotted portion, the at least one first impedance unit is connected at the left end or the right end thereof to the first reference conductor via the at least one fourth impedance unit.

In one embodiment of the present invention, further comprising at least one fourth impedance unit and at least one fifth impedance unit, wherein the at least one fourth impedance unit and the at least one fifth impedance unit are disposed in the slotted portion, the first impedance unit is connected at the left end thereof or the right end thereof to the first reference conductor via the at least one fourth impedance unit, and the second impedance unit is connected at the left end thereof or the right end thereof to the first reference conductor via the at least one fifth impedance unit.

In one embodiment of the present invention, further comprising at least one fourth impedance unit and at least one sixth impedance unit, wherein the at least one fourth impedance unit and the at least one sixth impedance unit are disposed in the slotted portion, the first impedance unit is connected at the left end thereof or the right end thereof to the first reference conductor via the at least one fourth impedance unit, and the third impedance unit is connected at the left end thereof or the right end thereof to the first reference conductor via the at least one sixth impedance unit.

In one embodiment of the present invention, further comprising at least one fourth impedance unit, at least one fifth impedance unit, and at least one sixth impedance unit; wherein the at least one fourth impedance unit, the at least one fifth impedance unit, and the at least one sixth impedance unit are disposed in the slotted portion; the first impedance unit is connected at the left end thereof or the right end thereof to the first reference conductor via the at least one fourth impedance unit, the second impedance unit is connected at the left end thereof or the right end thereof to the first reference conductor via the at least one fifth impedance unit, and the third impedance unit is connected at the left end thereof or the right end thereof to the first reference conductor via the at least one sixth impedance unit.

In one embodiment of the present invention, further comprising one or more fourth impedance units disposed in the slotted portion, wherein each of the fourth impedance units is connected at one end thereof between two adjacent first impedance units, and connected at the other end thereof to the first reference conductor.

In one embodiment of the present invention, further comprising one or more fourth impedance units and one or more fifth impedance units; wherein the one or more fourth impedance units and the one or more fifth impedance units are disposed in the slotted portion; each of the fourth impedance units is connected at one end thereof between two adjacent first impedance units, and connected at the other end thereof to the first reference conductor, and each of the fifth impedance units is connected at one end thereof between two adjacent second impedance units, and connected at the other end thereof to the first reference conductor.

In one embodiment of the present invention, further comprising one or more fourth impedance units and one or more sixth impedance units; wherein the one or more fourth impedance units and the one or more sixth impedance units are disposed in the slotted portion; each of the fourth impedance units is connected at one end thereof between two adjacent first impedance units, and connected at the other end thereof to the first reference conductor, and each of the sixth impedance units is connected at one end thereof between two adjacent third impedance units, and connected at the other end thereof to the first reference conductor.

In one embodiment of the present invention, further comprising one or more fourth impedance units, one or more fifth impedance units, and one or more sixth impedance units; wherein the one or more fourth impedance units, the one or more fifth impedance units, and the one or more sixth impedance units are disposed in the slotted portion; each of the fourth impedance units is connected at one end thereof between two adjacent first impedance units, and connected at the other end thereof to the first reference conductor, each of the fifth impedance units is connected at one end thereof between two adjacent second impedance units, and connected at the other end thereof to the first reference conductor, and each of the sixth impedance units is connected at one end thereof between two adjacent third impedance units, and connected at the other end thereof to the first reference conductor.

In one embodiment of the present invention, wherein the slotted structure further comprises a second reference conductor, wherein the second reference conductor is configured in the hollow portion based on the position of the at least one transmission conductor.

In one embodiment of the present invention, wherein the number of the transmission conductors is two to form a pair of differential transmission conductors.

In one embodiment of the present invention, wherein the frame portion and the first reference conductor are formed as an asymmetric coplanar strip line.

The present invention further comprises a filter device, comprising: a substrate; at least one transmission conductor configured on a first surface of the substrate; and a first reference conductor, configured on a second surface of the substrate, and comprising a slotted structure, the slotted structure comprising: a frame portion; a slotted portion surrounding the frame portion; and a hollow portion formed in the frame portion; wherein at least one first impedance unit is disposed in the slotted portion, and connected to the frame portion and the first reference conductor.

In one embodiment of the present invention, further at least one second impedance unit, wherein the at least one first impedance unit is disposed in the slotted portion based on the position of the at least one transmission conductor, and connected to the first side of the frame portion and the first reference conductor; the at least one second impedance unit is disposed in the slotted portion based on the position of the at least one transmission conductor, and connected to the third side of the frame portion and the first reference conductor.

In one embodiment of the present invention, further at least one third impedance unit, wherein the at least one third impedance unit is disposed in the slotted portion, and connected to the second side of the frame portion and the first reference conductor or connected to the fourth side of the frame portion and the first reference conductor.

In one embodiment of the present invention, further at least one third impedance unit, wherein the at least one first impedance unit is disposed in the slotted portion based on the position of the at least one transmission conductor, and connected to the first side of the frame portion and the first reference conductor; the at least one third impedance unit is disposed in the slotted portion, and connected to the second side of the frame portion and the first reference conductor or connected to the fourth side of the frame portion and the first reference conductor.

DETAILED DESCRIPTION OF THE PREFERRED EMBODIMENTS

Figure 1:
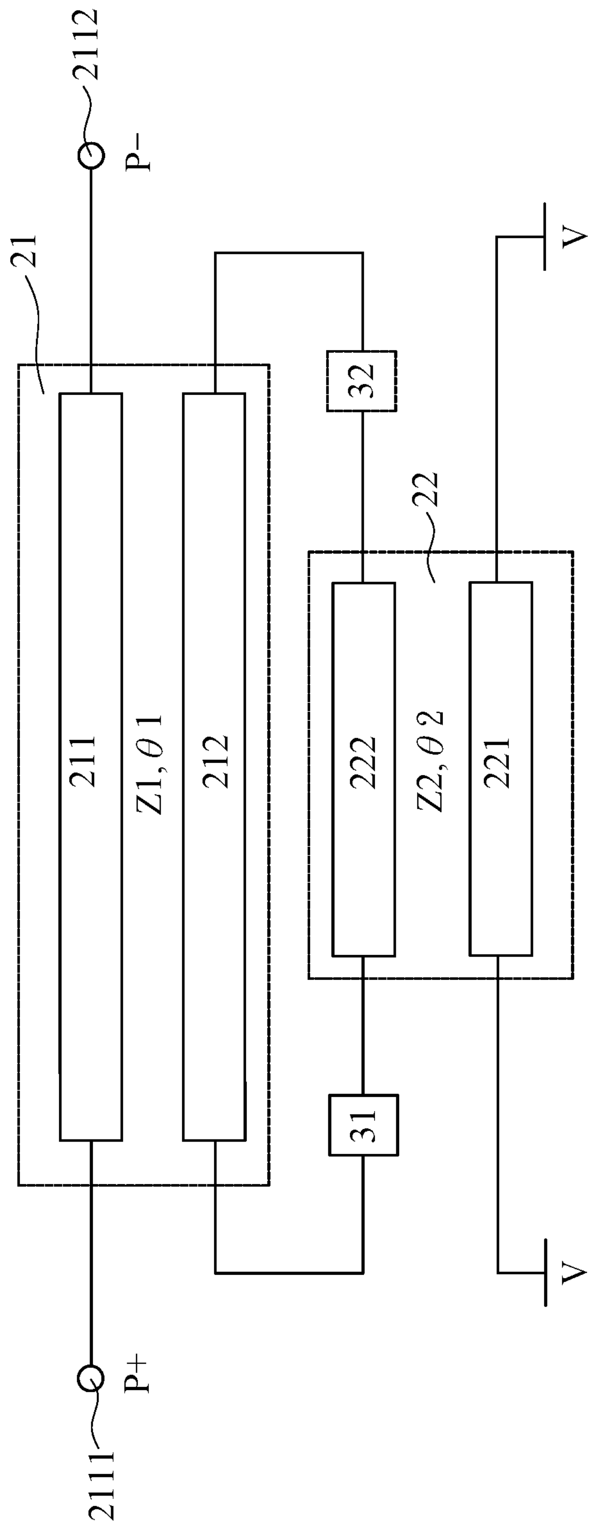
FIG. 1 is a circuit diagram of an equivalent filter circuit according to one embodiment of the present invention.

Referring to FIG. 1, there is shown a circuit diagram of an equivalent filter circuit according to one embodiment of the present invention. As shown in FIG. 1, the equivalent filter circuit 200 is used to suppress at least one electromagnetic noise at at least one specific frequency, and the equivalent filter circuit 200 is a single-ended equivalent filter circuit. The equivalent filter circuit 200 comprises at least one first equivalent transmission line model 21 and at least one equivalent transmission line model 22. The first equivalent transmission line model 21 comprises a first master transmission conductor 211 and a first slave transmission conductor 212. The second equivalent transmission line model 22 comprises a second master transmission conductor 221 and a second slave transmission conductor 222.

The first master transmission conductor 211 is connected at the left end thereof to a signal input port 2111 (P+), and connected at the right end thereof to a signal output port 2112 (P−). The second master transmission conductor 221 is connected at the left and right ends thereof to a reference potential (V). The first slave transmission conductor 212 is connected at the left end thereof to the left end of the second slave transmission conductor 222, and connected at the right end thereof to the right end of the second slave transmission conductor 222.

The equivalent filter circuit 200 of the present invention is an absorption equivalent filter circuit, which is provided with at least one impedance unit therein to absorb the at least one noise at the at least one specific frequency by the impedance unit. In the present embodiment, at least one first impedance unit 31 is connected between the left end of the first slave transmission conductor 212 and the left end of the second slave transmission conductor 222 in series, or at least one second impedance unit 32 is connected between the right end of the first slave transmission conductor 212 and the right end of the second slave transmission conductor 222 in series.

Figure 2:
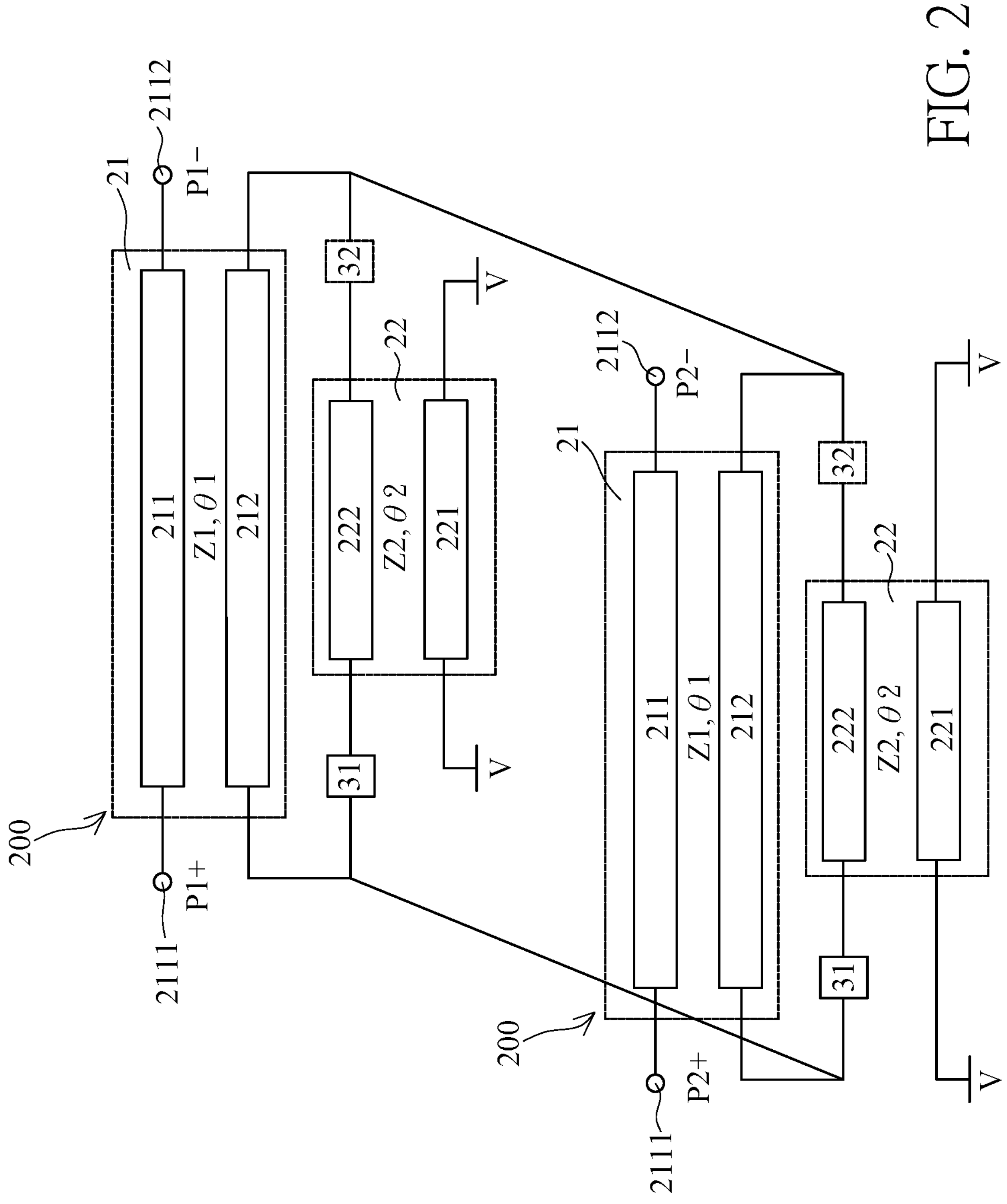
FIG. 2 is a circuit diagram of an equivalent filter circuit according to another embodiment of the present invention.

Further, the two single-ended equivalent filter circuits 200 can be combined into a differential equivalent filter circuit. As shown in FIG. 2, the differential equivalent filter circuit comprises the two first equivalent transmission line models 21 and the two second equivalent transmission line models 22. The two first equivalent transmission line models 21 comprise a pair of the signal input ports 2111 (P1+ and P2+) and a pair of the signal output ports 2112 (P1− and P2−). The left ends of the second slave transmission conductors 222 of the two equivalent transmission line models 22 are connected together via the first impedance units 31, and the the right ends of the second slave transmission conductors 222 of the two equivalent transmission line models 22 are directly connected together or connected together via the second impedance units 32.

Figure 3:
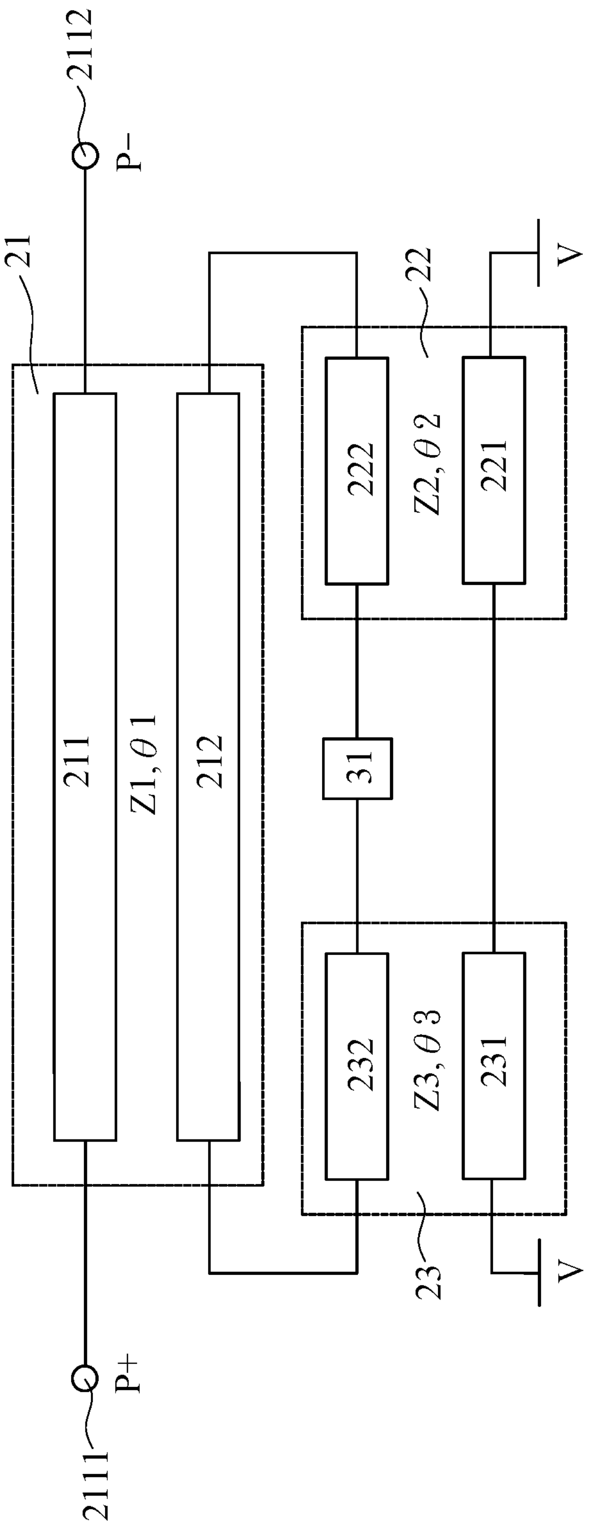
FIG. 3 is a circuit diagram of an equivalent filter circuit according to another embodiment of the present invention.

Referring to FIG. 3, there is shown a circuit diagram of an equivalent filter circuit according to another embodiment of the present invention. As shown in FIG. 3, the equivalent filter circuit 201 of the present embodiment further comprises at least one third equivalent transmission line model 23. The third equivalent transmission line model 23 comprises a third master transmission conductor 231 and a third slave transmission conductor 232. The second master transmission conductor 221 is connected at the left end thereof to the reference potential via the third master transmission conductor 231, and the third slave transmission conductor 232 and the first impedance unit 31 are connected between the left end of the first slave transmission conductor 212 and the left end of the second slave transmission conductor 222 in series.

Figure 4:
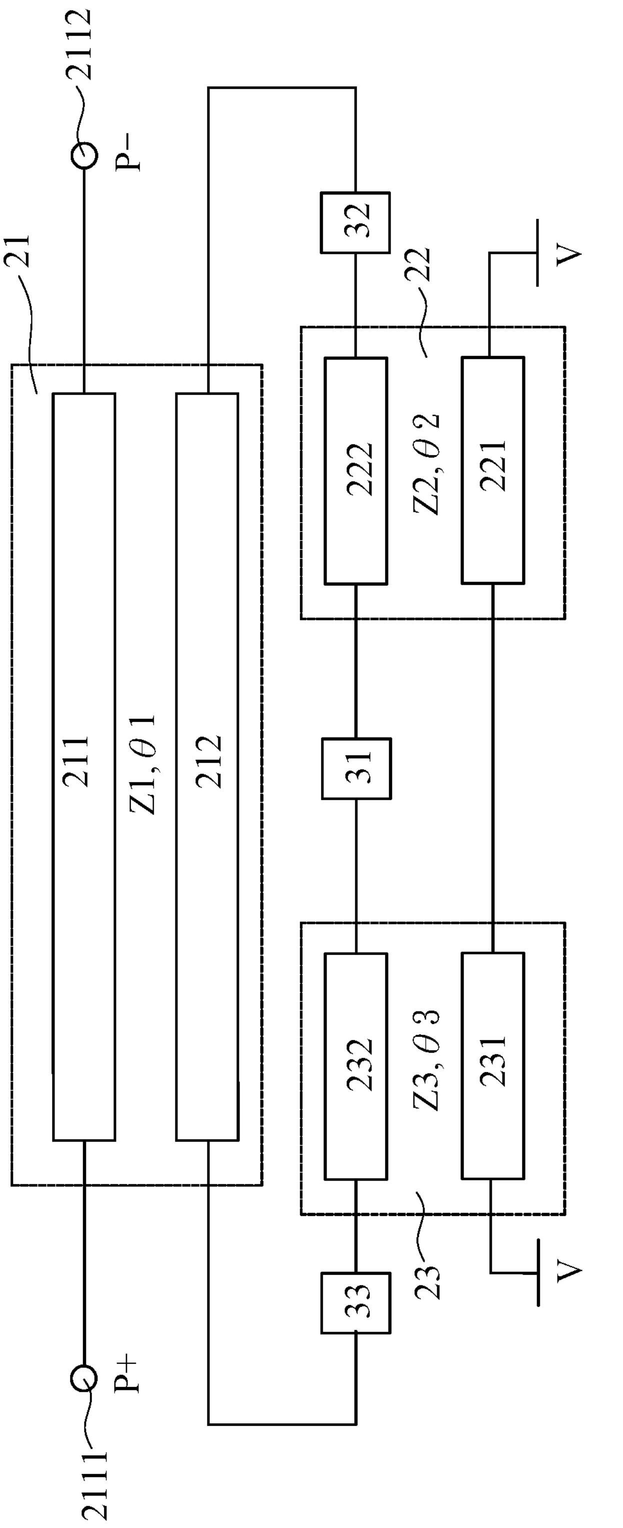
FIG. 4 is a circuit diagram of an equivalent filter circuit according to another embodiment of the present invention.

Referring to FIG. 4, there is shown a circuit diagram of an equivalent filter circuit according to another embodiment of the present invention. Comparing to the equivalent filter circuit 201 in the embodiment of FIG. 3, the equivalent filter circuit 202 in the embodiment of FIG. 4 further comprises at least one second impedance unit 32 and at least one third impedance unit 33. The second impedance unit 32 is connected between the right end of the first slave transmission conductor 212 and the right end of the second slave transmission conductor 222 in series, and the third impedance unit 33 is connected between the left end of the first slave transmission conductor 212 and the left end of the third slave transmission conductor 232 in series.

Figure 5:
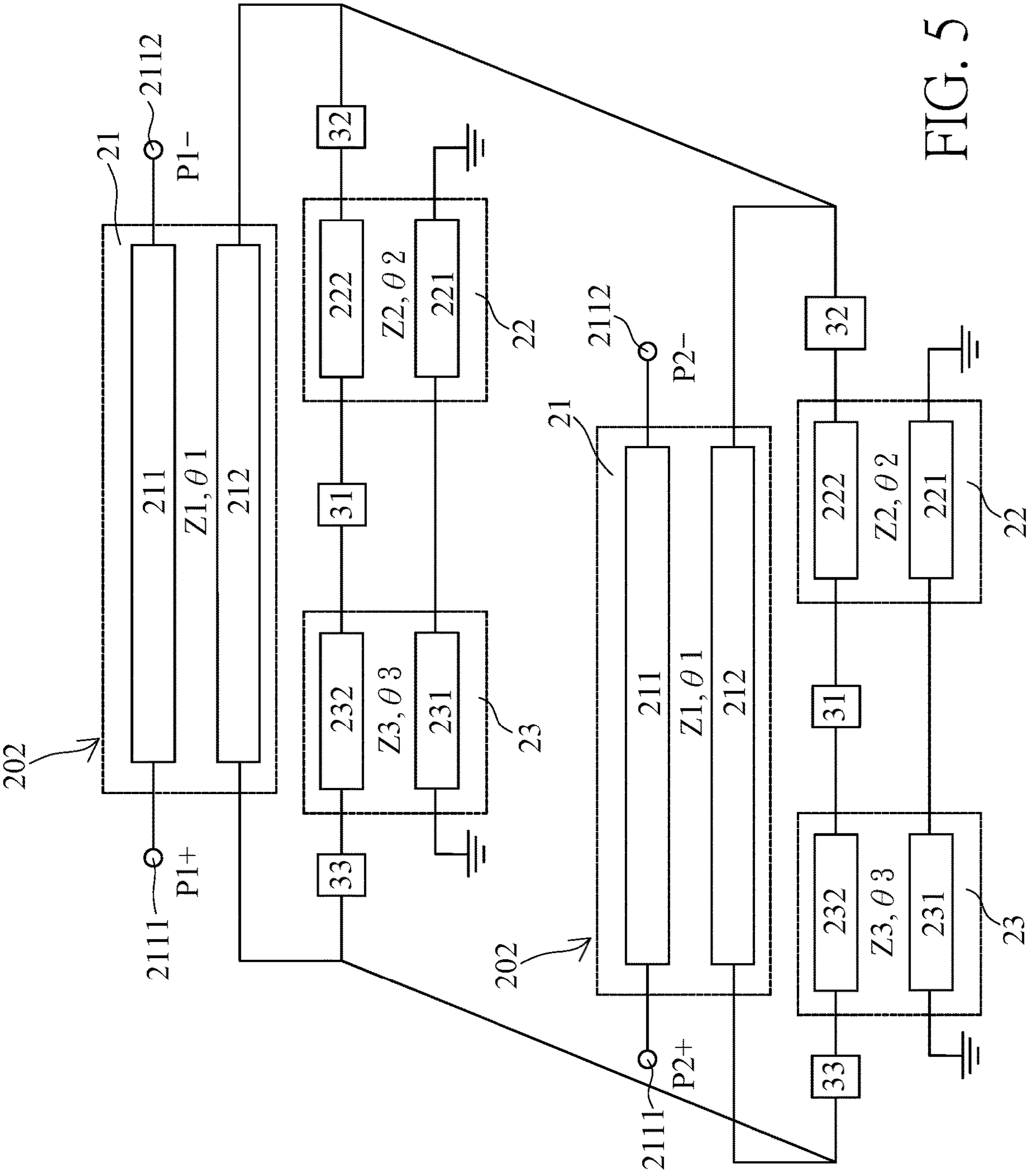
FIG. 5 is a circuit diagram of an equivalent filter circuit according to another embodiment of the present invention.

Further, the two single-ended equivalent filter circuits 201/202 can be combined into a differential equivalent filter circuit. As shown in FIG. 5, the differential equivalent filter circuit comprises the two first equivalent transmission line models 21, the two second equivalent transmission line models 22, and the two third equivalent transmission line models 23. The two first equivalent transmission line models 21 comprise a pair of the signal input ports 2111 (P1+ and P2+) and a pair of the signal output ports 2112 (P1− and P2−). In one embodiment of the present invention, the left ends of the third slave transmission conductors 232 of the two third equivalent transmission line models 23 are directly connected together or connected together via the third impedance units 33, and the right ends of the second slave transmission conductors 222 of the two equivalent transmission line models 22 are directly connected together or connected together via the second impedance units 32.

Figure 6:
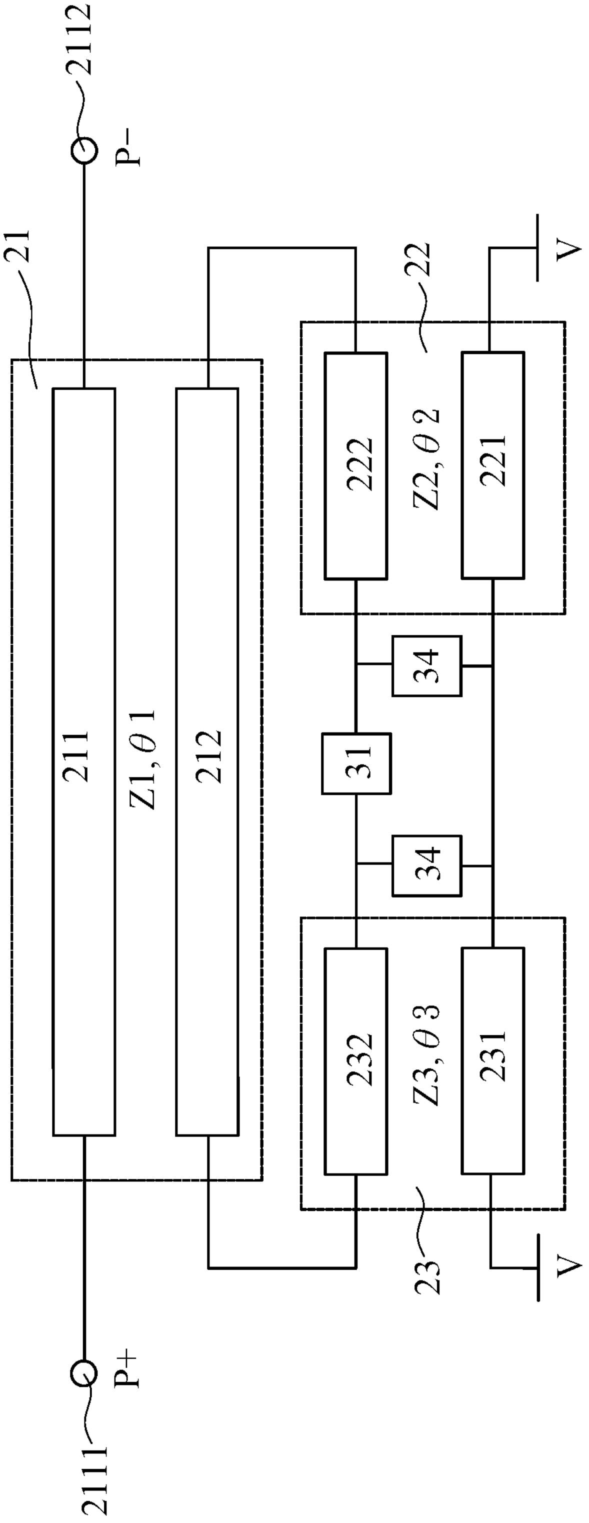
FIG. 6 is a circuit diagram of an equivalent filter circuit according to another embodiment of the present invention.

Referring to FIG. 6, there is shown a circuit diagram of an equivalent filter circuit according to another embodiment of the present invention. Comparing to the equivalent filter circuit 201 in the embodiment of FIG. 3, the equivalent filter circuit 203 in the embodiment of FIG. 6 further comprises at least one fourth impedance unit 34. The fourth impedance unit 34 is connected between the right end of the first impedance unit 31 and the left end of the second master transmission conductor 221; or the fourth impedance unit 34 is connected between the left end of the first impedance unit 31 and the left end of the second master transmission conductor 221.

Figure 7:
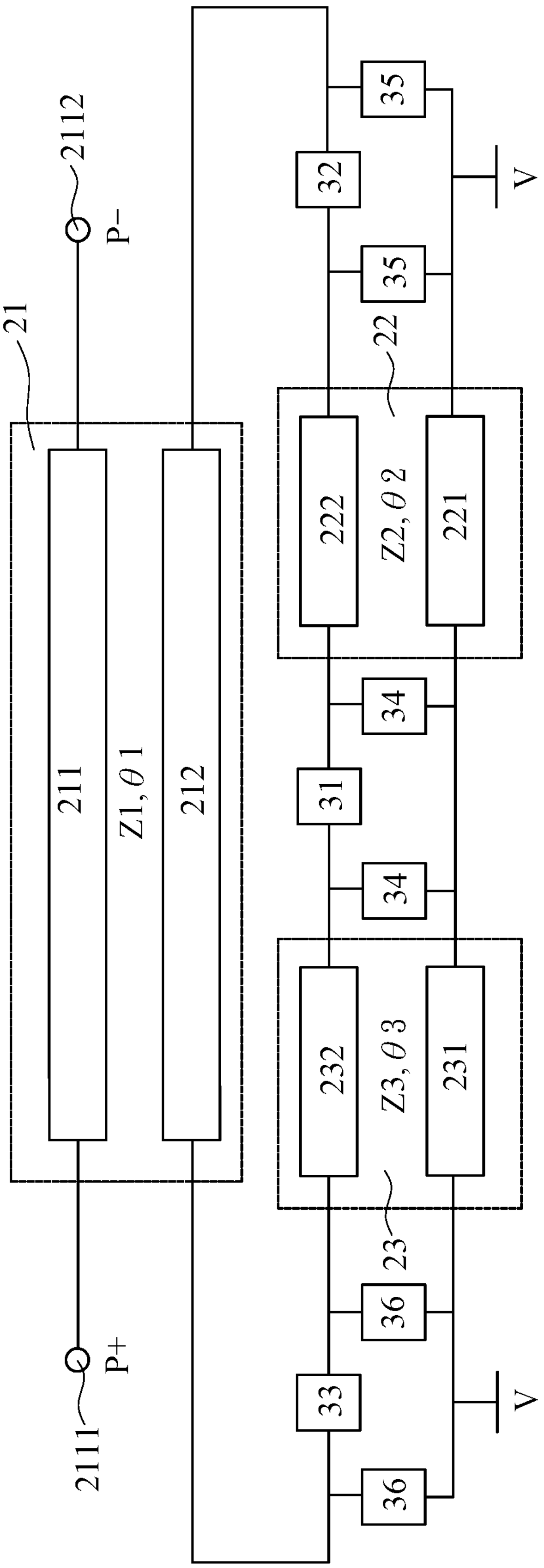
FIG. 7 is a circuit diagram of an equivalent filter circuit according to another embodiment of the present invention.

Referring to FIG. 7, there is shown a circuit diagram of an equivalent filter circuit according to another embodiment of the present invention. Comparing to the equivalent filter circuit 203 in the embodiment of FIG. 6, the equivalent filter circuit 204 in the embodiment of FIG. 7 further comprises at least one second impedance unit 32, at least one third impedance unit 33, at least one fifth impedance unit 35, and at least one sixth impedance unit 36.

The second impedance unit 32 is connected between the right end of the first slave transmission conductor 212 and the right end of the second slave transmission conductor 222 in series. The third impedance unit 33 is connected between the left end of the first slave transmission conductor 212 and the left end of the third slave transmission conductor 232 in series. The fifth impedance unit 35 is connected between the right end of the second impedance unit 32 and the reference potential, or the fifth impedance unit 35 is connected between the left end of the second impedance unit 32 and the reference potential. The sixth impedance unit 36 is connected between the right end of the third impedance unit 33 and the reference potential, or the sixth impedance unit 36 is connected between the left end of the third impedance unit 33 and the reference potential. In the present embodiment, these fourth impedance units 34 located at the left and right ends of the first impedance units 31 may have the same impedance value or the different impedance values; these fifth impedance units 35 located at the left and right ends of the second impedance units 32 may have the same impedance value or the different impedance values; these sixth impedance units 36 located at the left and right ends of the third impedance units 33 may have the same impedance value or the different impedance values.

Figure 8:
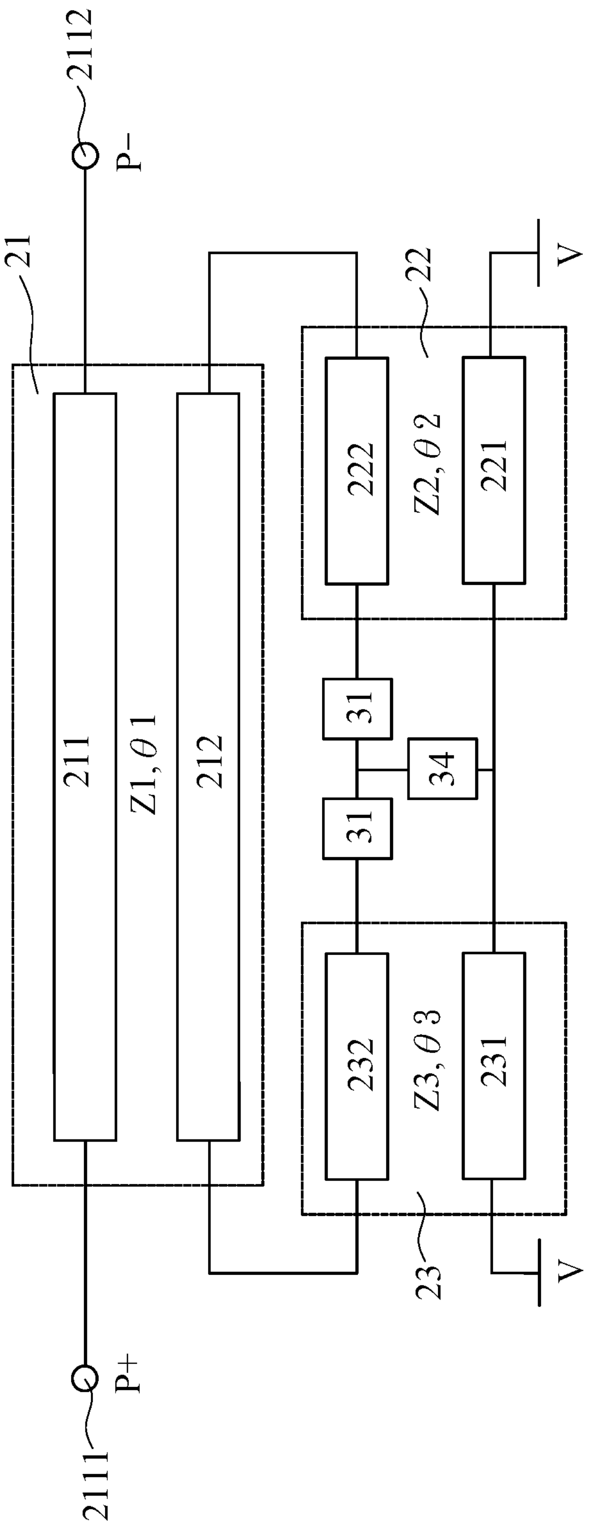
FIG. 8 is a circuit diagram of an equivalent filter circuit according to another embodiment of the present invention.

Referring to FIG. 8, there is shown a circuit diagram of an equivalent filter circuit according to another embodiment of the present invention. In the equivalent filter circuit 205 in the embodiment of FIG. 8, two or more than two first impedance units 31 are connected between the second slave transmission conductor 222 and the third slave transmission conductor 232 in series. Besides, the equivalent filter circuit 205 comprises one or more fourth impedance units 34. Each of the fourth impedance units 34 is connected at one end thereof between two adjacent first impedance units 31, and connected at the other end thereof to the second master transmission conductor 221.

Figure 9:
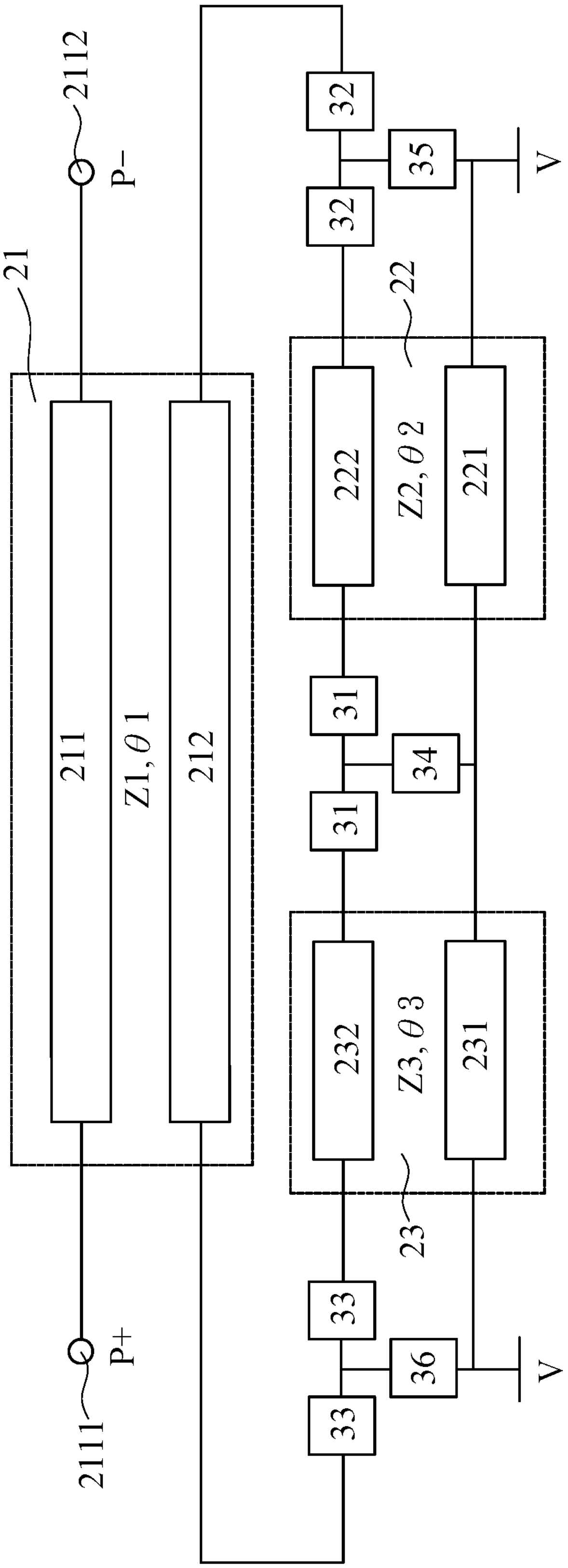
FIG. 9 is a circuit diagram of an equivalent filter circuit according to another embodiment of the present invention.

Referring to FIG. 9, there is shown a circuit diagram of an equivalent filter circuit according to another embodiment of the present invention. Comparing to the equivalent filter circuit 205 in the embodiment of FIG. 8, the equivalent filter circuit 206 in the embodiment of FIG. 9 further comprises two or more than two second impedance units 32, two or more than two third impedance units 33, at least one fifth impedance units 35, and at least one sixth impedance units 36.

The second impedance units 32 are connected between the right end of the first slave transmission conductor 212 and the right end of the second slave transmission conductor 222 in series, and the third impedance units 33 are connected between the left end of the first slave transmission conductor 212 and the left end of the third slave transmission conductor 232 in series. Each of the fifth impedance units 35 is connected at one end thereof between two adjacent second impedance units 32, and connected at the other end thereof to the reference potential V. Each of the sixth impedance units 36 is connected at one end thereof between two adjacent third impedance units 33, and connected at the other end thereof to the reference potential V. In the present embodiment, these first impedance units 31 located at the left and right ends of the fourth impedance unit 34 may have the same impedance value or the different impedance values; these second impedance units 32 located at the left and right ends of the fifth impedance unit 35 may have the same impedance value or the different impedance values; these third impedance units 33 located at the left and right ends of the sixth impedance unit 36 may have the same impedance value or the different impedance values.

Figure 10:
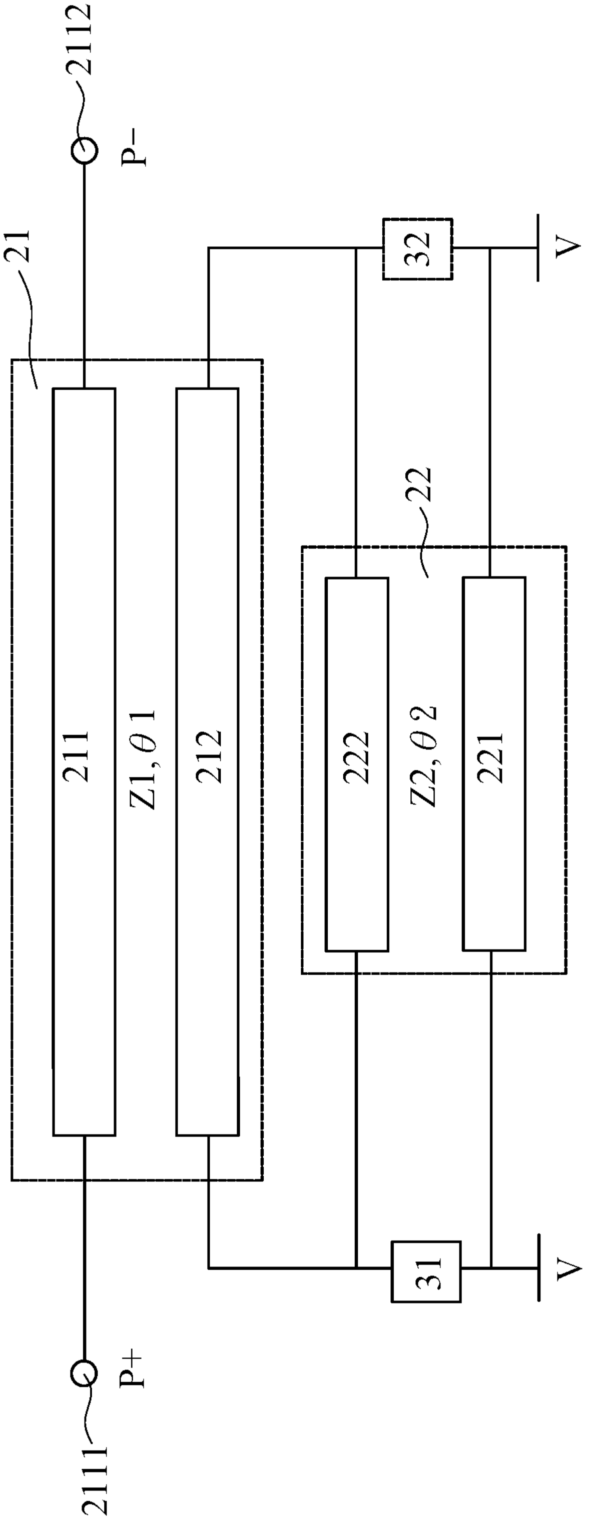
FIG. 10 is a circuit diagram of an equivalent filter circuit according to another embodiment of the present invention.

Referring to FIG. 10, there is shown a circuit diagram of an equivalent filter circuit according to another embodiment of the present invention. Comparing to the equivalent filter circuit 200 in the embodiment of FIG. 1 where the impedance units are provided in series, the equivalent filter circuit 207 of this embodiment is provided with at least one impedance unit in parallel. For example, the second equivalent transmission line model 22 is connected to at least one first impedance unit 31 in parallel via the left end of the second master transmission conductor 221 and the left end of the second slave transmission conductor 222; or, the second equivalent transmission line model 22 is connected to at least one second impedance unit 32 in parallel via the right end of the second master transmission conductor 221 and the right end of the second slave transmission conductor 222.

Figure 11:
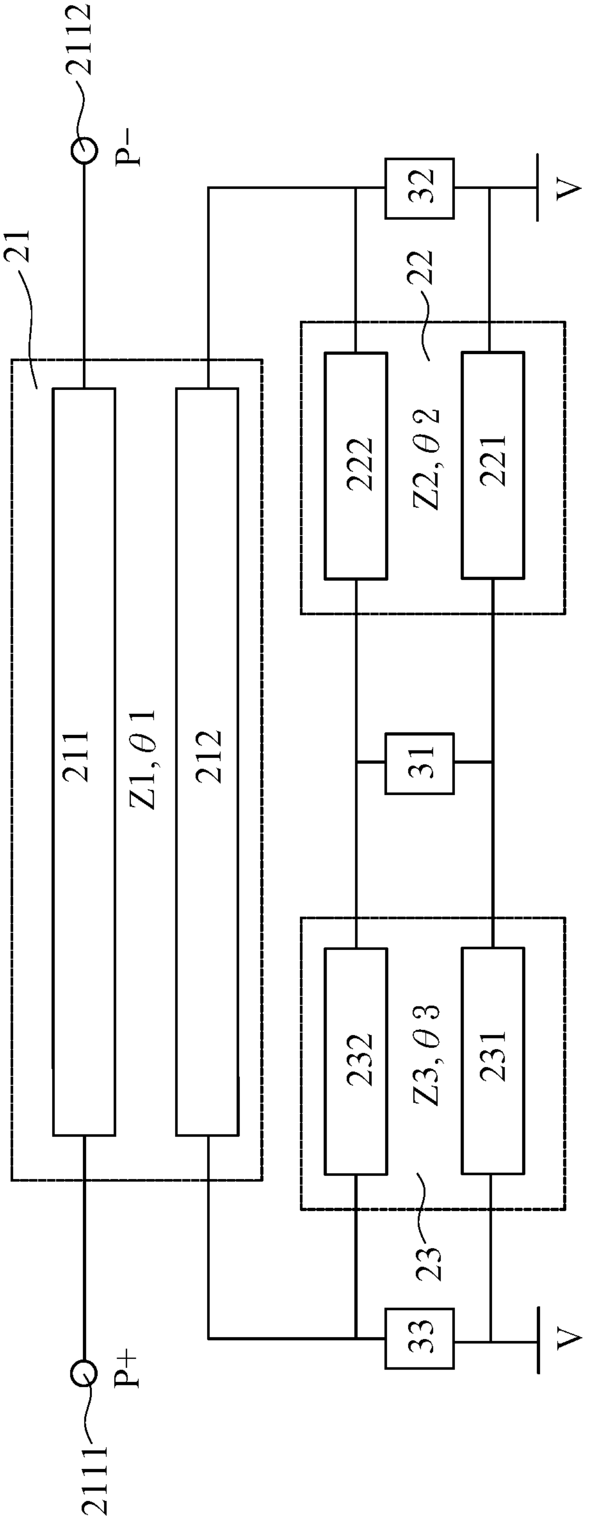
FIG. 11 is a circuit diagram of an equivalent filter circuit according to another embodiment of the present invention.

Referring to FIG. 11, there is shown a circuit diagram of an equivalent filter circuit according to another embodiment of the present invention. Comparing to the equivalent filter circuit 207 in the embodiment of FIG. 10, the equivalent filter circuit 208 in the embodiment of FIG. 11 further comprises at least one third equivalent transmission line model 23. The third equivalent transmission line model 23 is connected to at least one first impedance unit 31 in parallel via the right end of the third master transmission conductor 231 and the right end of the third slave transmission conductor 232, and connected to at least one third impedance unit 33 in parallel via the left end of the third master transmission conductor 231 and the left end of the third slave transmission conductor 232.

In each of the above embodiments, the first master transmission conductor 211 and the first slave transmission conductor 212 of the first equivalent transmission line model 21 are coupled to generate a first characteristic impedance (Z1) and a first electrical length (θ1), the second master transmission conductor 221 and the second slave transmission conductor 222 of the second equivalent transmission line model 22 are coupled to generate a second characteristic impedance (Z2) and a second electrical length (θ2), and the third master transmission conductor 231 and the third slave transmission conductor 232 of the second equivalent transmission line model 23 are coupled to generate a third characteristic impedance (Z3) and a third electrical length (θ3). The first characteristic impedance (Z1), the second characteristic impedance (Z2), and the third characteristic impedance (Z3) are of the same impedance value or the different impedance values. The first electrical length (θ1), the second electrical length (θ2), and the third electrical length (θ3) are of the same electrical length or the different electrical lengths. In one embodiment of the present invention, the second electrical length (θ2) or the third electrical length (θ3) is designed close to zero.

The first equivalent transmission line model 21, the second equivalent transmission line model 22, or the second equivalent transmission line model 23 are a microstrip line, a slotted line, an artificial transmission line, a modified-T circuit line, or other transmission line structure capable of transmitting signals.

The equivalent filter circuit 200/201/202/203/204/205/206/207/208, respectively of the present invention is provided with one or more impedance units 31, 32, 33, 34, 35, or 36 in series, parallel, or series-parallel. The impedance unit 31, 32, 33, 34, 35, or 36 is at least one resistor, at least one inductor, at least one inductor, or a series-parallel combination of the resistor, the inductor, and the capacitor. In one embodiment of the present invention, the impedance units 31, 32, 33, 34, 35, and 36 can be designed to have the same impedance value or the different impedance values. In other embodiment of the present invention, the impedance values of the one or more impedance units 31, 32, 33, 34, 35, and 36 can be designed to be zero.

Figure 12:
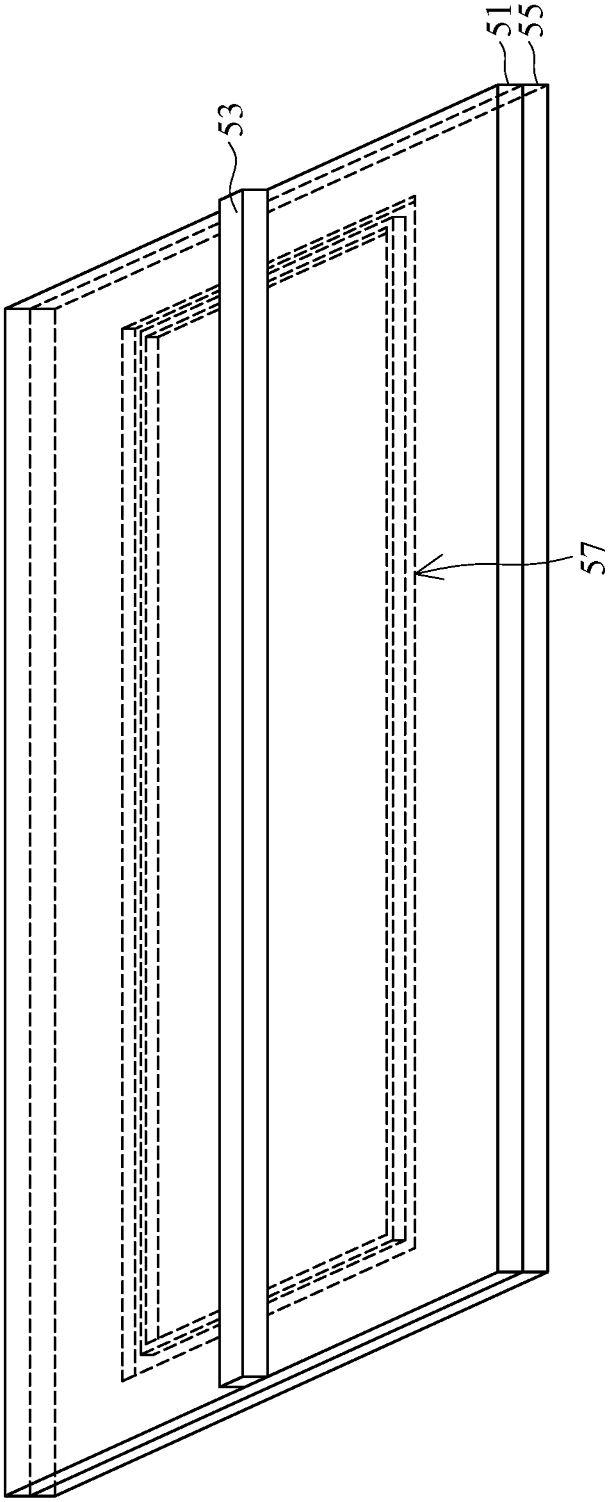
FIG. 12 is a three-dimensional structural perspective view of a filter device according to one embodiment of the present invention.
Figure 13:
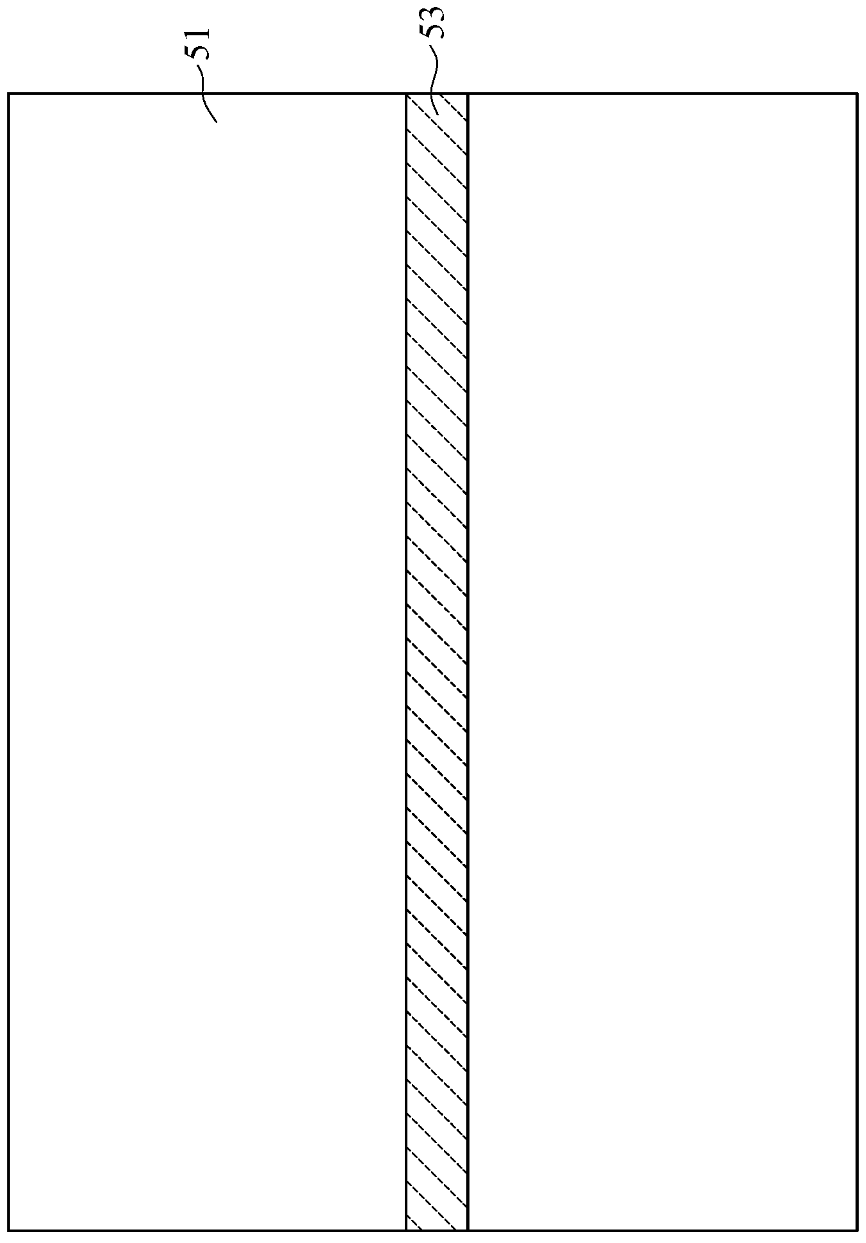
FIG. 13 is a structural top view of a filter device according to one embodiment of the present invention.
Figure 14:
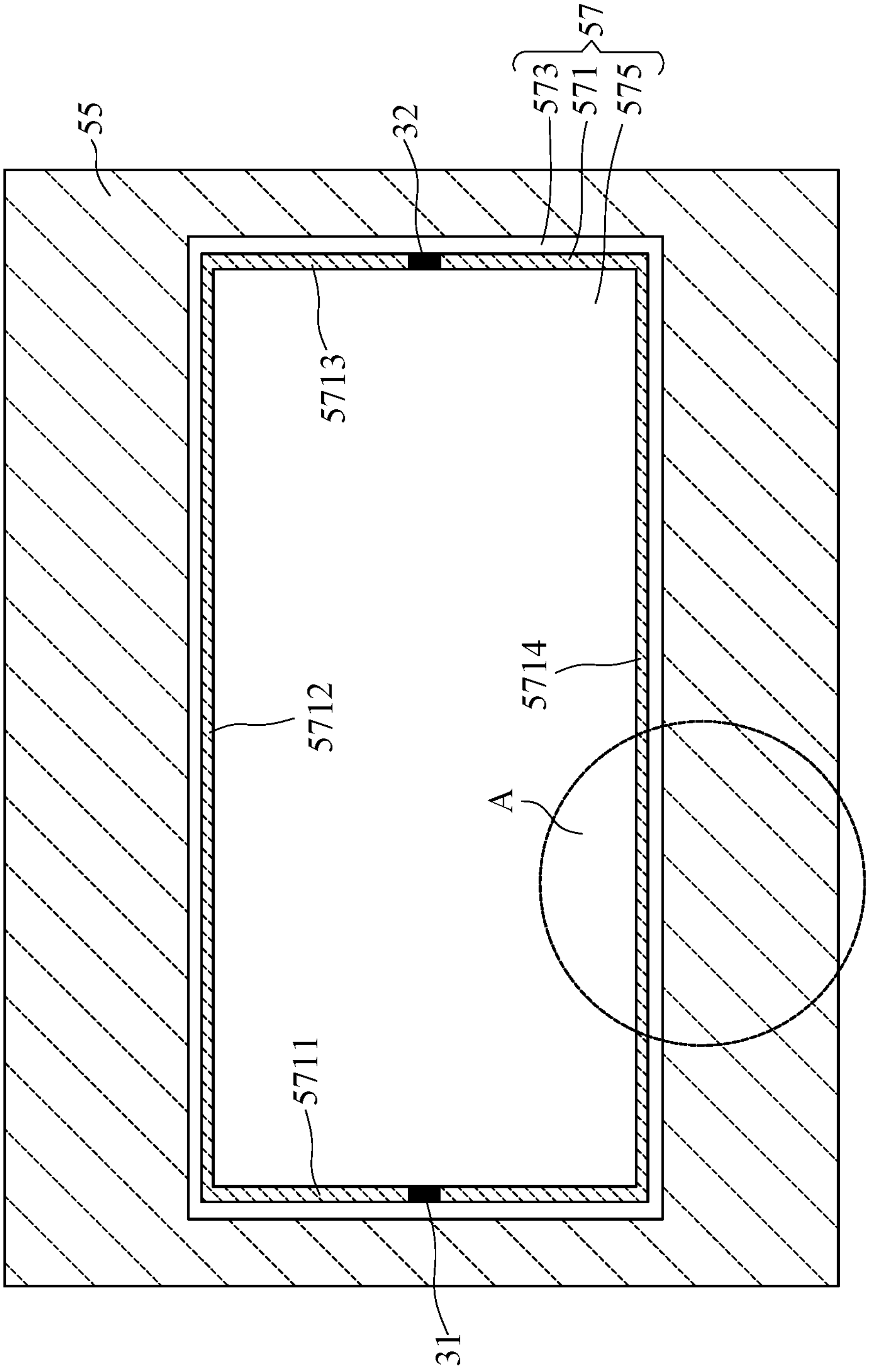
FIG. 14 is a structural bottom view of a filter device according to one embodiment of the present invention.

Referring to FIG. 12, FIG. 13, and FIG. 14, there are shown a three-dimensional structural perspective view, a structural top view, and a structural bottom view of a filter device according to one embodiment of the present invention, and also referring to FIG. 1. As shown in FIG. 12, FIG. 13, and FIG. 14, the filter device 500 comprises a substrate 51, at least one transmission conductor 53, and a first reference conductor 55. The transmission conductor 53 (FIGS. 12 and 13) is configured on a first surface (such as top surface) of the substrate 51 (FIGS. 12 and 13), and the first reference conductor 55 (FIGS. 12 and 14) is configured on a second surface (such as bottom surface) of the substrate 51. The first reference conductor 55 comprises a slotted structure 57 (FIGS. 12 and 14). As shown FIGS. 14 and 14A, the slotted structure 57 comprises a frame portion 571, a slotted portion 573, and a hollow portion 575. In the present invention, the transmission conductor 53, the frame portion 571, the slotted portion 573, and the hollow portion 575 can be a microstrip line, a slotted line, an artificial transmission line, a modified-T circuit line, or other transmission line structure capable of transmitting signals. The slotted portion 573 surrounds the frame portion 571, and the hollow portion 575 is formed in the frame portion 571. Besides, at least one first impedance unit 31 and/or at least one first impedance unit 32 are disposed on the frame portion 571, and connected with the frame portion 571. The frame portion 571 is a quadrilateral frame, and comprises a first side 5711, a second side 5712, a third side 5713, and a fourth side 5714. The first side 5711 is connected at one end thereof to one end of the third side 5713 via the second side 5712, and connected at one end thereof to the other end of the third side 5713 via the fourth side 5714. The first side 5711 is corresponding to the third side 5713, and the second side 5712 is corresponding to the fourth side 5714. The transmission conductor 53 is projectively across the first side 5711 and the third side 5713 of the frame portion 571. In the present embodiment, the first impedance unit 31 is disposed on the first side 5711 of the frame portion 571 based on the position of the transmission conductor 53, for example, the first impedance unit 31 is disposed on the first side 5711 of the frame portion 571 that is located at the lower left side of the transmission conductor 53; the second impedance unit 32 is disposed on the third side 5713 of the frame portion 571 based on the position of the transmission conductor 53, for example, the second impedance unit 32 is disposed on the third side 5713 of the frame portion 571 that is located at the lower right side of the transmission conductor 53.

Figure 14A:
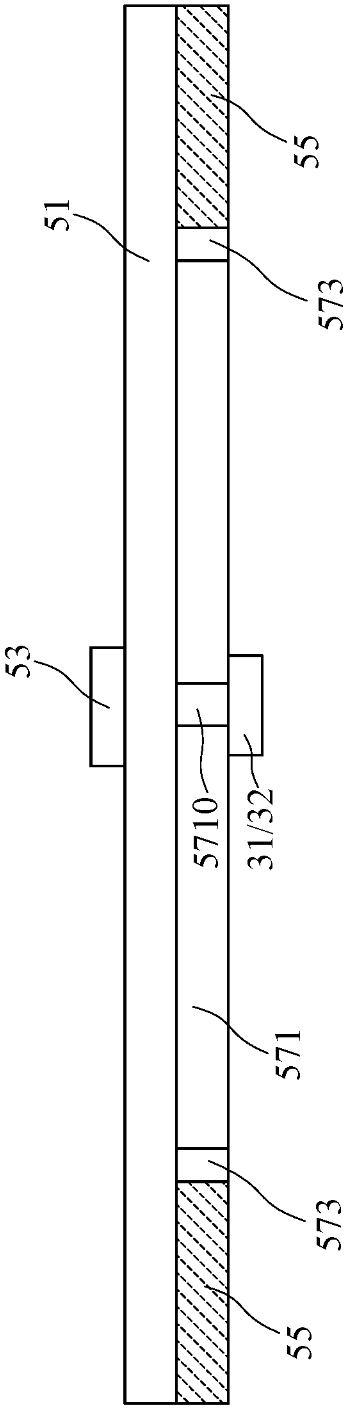
FIG. 14A is a structural section view of a filter device according to one embodiment of the present invention.

In one embodiment of the present invention, the first impedance unit 31 or the second impedance unit 32 is disposed on the frame portion 571, and directly connected to the frame portion 571. As shown in FIG. 14A, the frame portion 571 comprises at least one notch 5710. The first impedance unit 31 or the second impedance unit 32 is disposed on the notch 5710 of the frame portion 571, and the left and right ends of the first impedance unit 31 or the second impedance unit 32 are directly connected to the frame portion 571 located on both sides of the notch 5710, respectively.

Figure 14B:
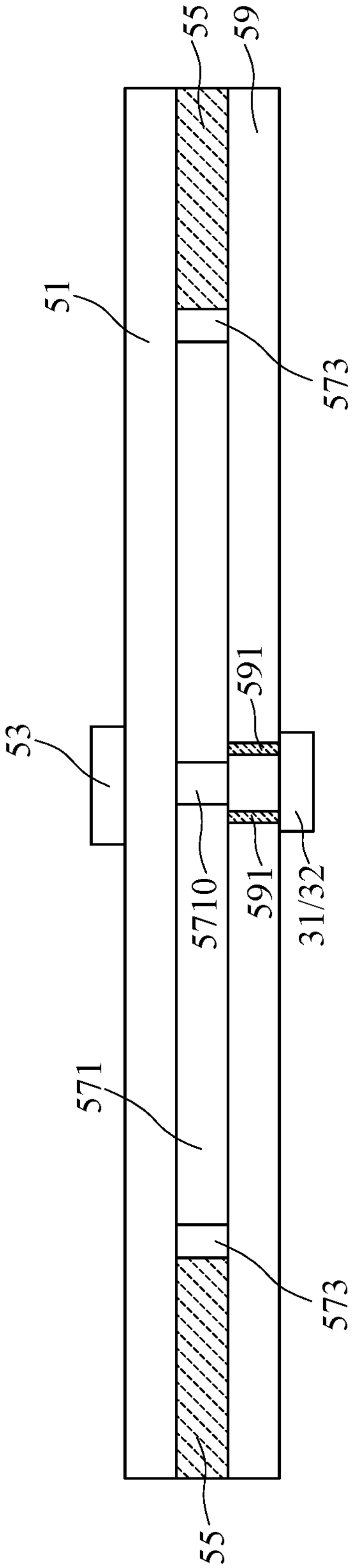
FIG. 14B is a structural section view of a filter device according to another embodiment of the present invention.

In another embodiment of the present invention, the first impedance unit 31 or the second impedance unit 32 is disposed on the frame portion 571, and connected to the frame portion 571 via at least one conductive via hole. As shown in FIG. 14B, the first reference conductor 55 is provided at the top surface thereof with the substrate 51, and provided at the bottom surface thereof with other substrate 59. The frame portion 571 comprises at least one notch 5710. Two conductive via holes 591 are configured in the substrate 59. The left and right ends of the first impedance unit 31 or the second impedance unit 32 are connected to the frame portion 571 on both sides of the notch 5710 via the corresponding conductive via holes 591.

The equivalent filter circuit 200 of FIG. 1 may be equivalently formed by the filter device 500. The transmission conductor 53 is coupled to the frame portion 571 to generate the first equivalent transmission line model 21. The frame portion 571 (FIG. 14B) is coupled to the first reference conductor 55 to generate the second equivalent transmission line model 22 (FIG. 1). The first master transmission conductor 211 of the first equivalent transmission line model 21 is represented as the equivalent element of the transmission conductor 53 (FIG. 14B), and the first slave transmission conductor 212 of the first equivalent transmission line model 21 is represented as the equivalent element of the frame portion 571. The second master transmission conductor 221 of the second equivalent transmission line model 22 is represented as the equivalent element of the first reference conductor 55, and the second slave transmission conductor 222 of the second equivalent transmission line model 22 is represented as the equivalent element of the frame portion 571. Furthermore, the first impedance unit 31 and the second impedance unit 32 of the filter device 500 are equivalent to the first impedance unit 31 and the second impedance unit 32 in the equivalent filter circuit 200 of FIG. 1.

In one embodiment of the present invention, the electrical lengths (θ1, θ2) and the characteristic impedances (Z1, Z2) of the first equivalent transmission line model 21 and the second equivalent transmission line model 22 may be adjusted by modifying the length and width of the transmission conductor 53, the frame portion 571, and/or the slotted portion 573, as shown in FIGS. 14A and 14B. Thus, the frequency where the electromagnetic noise is to be absorbed may be further adjusted by the modification of the electrical lengths (θ1, θ2) and the characteristic impedances (Z1, Z2).

Figure 15:
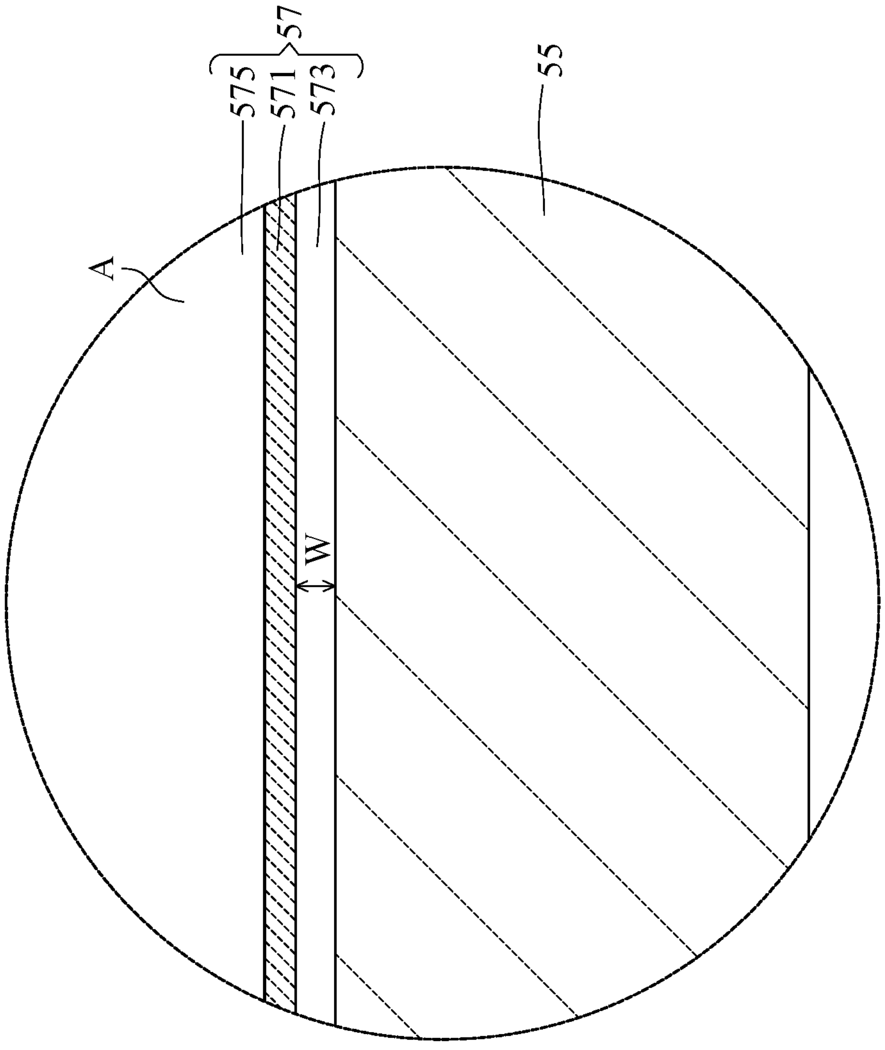
FIG. 15 is an enlarged view of area A in FIG. 14.

Further, referring to FIG. 14 and FIG. 15 at the same time, FIG. 15 is an enlarged view of area A in FIG. 14. For achieving the purpose of the transmission conductor with high impedance, the filter device 500 (FIG. 14) of the present invention is provided with the frame portion 571 (FIG. 15) that is having a narrower width W (FIG. 15), and configured in the slotted structure 57. The frame portion 571 having the narrower width and the first reference conductor 55 having a wider width may be formed an asymmetric coplanar strip. The frame portion 571 is configured on a position close to the first reference conductor 55, which can shorten the width (W) of the slot portion 573, so that the overall area of the filter 500 can be effectively reduced, and thereby the purpose of miniaturizing the circuit structure of the filter device 500 can be achieved. Besides, even if the frame portion 571 is very close to the first reference conductor 55, a large amount of electric field coupling is still generated between the frame portion 571 and the first reference conductor 55. However, since the wire body of the frame portion 571 of the filter device 500 is designed to have a thinner width, the inductive amount of the frame portion 571 will increase, and the impedance (Z0) of the transmission conductor will increase accordingly, thereby the purpose that the transmission conductor is having high impedance can be achieved.

Figure 16:
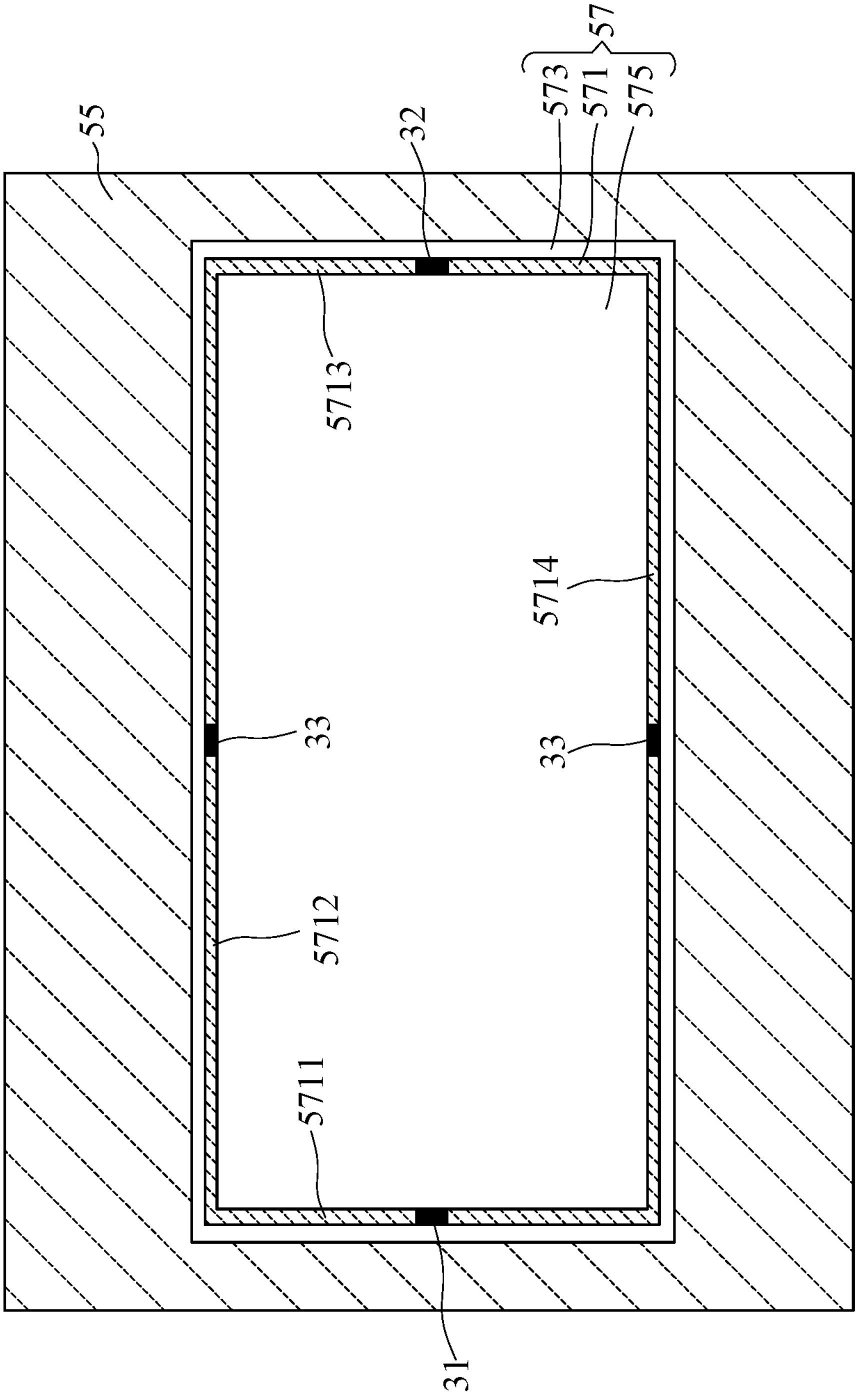
FIG. 16 is a structural bottom view of a filter device according to another embodiment of the present invention.

Referring to FIG. 16, there is shown a structural bottom view of a filter device according to another embodiment of the present invention, and also referring to FIG. 4, FIG. 12, and FIG. 13 at the same time. Comparing to the filter device 500 in FIG. 14, the filter device 501 in FIG. 16 further comprises at least one third impedance 33. The third impedance 33 is disposed on the second side 5712 or the fourth side 5714 of the frame portion 571, and connected with the frame portion 571. The third impedance 33 may be directly connected with the frame portion 571, as shown in FIG. 14A; otherwise, the third impedance 33 may be connected with the frame portion 571 via the conductive via hole, as shown in FIG. 14B. The equivalent filter circuit 202 in FIG. 4 may be equivalently formed by the filter device 501 in FIG. 16. The transmission conductor 53 (FIGS. 12 and 13) is coupled to the frame portion 571 to generate the first equivalent transmission line model 21 (FIG. 4). The frame portion 571 distributed at the right side of the third impedance unit 33 is coupled to the first reference conductor 55 to generate the second equivalent transmission line model 22 (FIG. 4). The frame portion 571 distributed at the left side of the third impedance unit 33 is coupled to the first reference conductor 55 to generate the third equivalent transmission line model 23. The first master transmission conductor 211 (FIG. 4) of the first equivalent transmission line model 21 is represented as the equivalent element of the transmission conductor 53, and the first slave transmission conductor 212 (FIG. 4) of the first equivalent transmission line model 21 is represented as the equivalent element of the frame portion 571. The second master transmission conductor 221 (FIG. 4) of the second equivalent transmission line model 22 is represented as the equivalent element of the first reference conductor 55, and the second slave transmission conductor 222 (FIG. 4) of the second equivalent transmission line model 22 is represented as the equivalent element of the frame portion 571. The third master transmission conductor 231 (FIG. 4) of the third equivalent transmission line model 23 (FIG. 4) is represented as the equivalent element of the first reference conductor 55, and the third slave transmission conductor 232 (FIG. 4) of the third equivalent transmission line model 23 is represented as the equivalent element of the frame portion 571. Furthermore, the first impedance unit 31, the second impedance unit 32, and the third impedance unit 33 of the filter device 501 are equivalent to the first impedance unit 31, the second impedance unit 32, and the third impedance unit 33 in the equivalent filter circuit 202 of FIG. 4.

In one embodiment of the present invention, the electrical lengths (θ1, θ2, θ3) (FIG. 4) and the characteristic impedances (Z1, Z2, Z3) (FIG. 4) of the first equivalent transmission line model 21, the second equivalent transmission line model 22, and the third equivalent transmission line model 23 may be adjusted by modifying the length and width of the transmission conductor 53, the frame portion 571, and/or the slotted portion 573. Thus, the frequency where the electromagnetic noise is to be absorbed may be further adjusted by the modification of the electrical lengths (θ1, θ2, θ3) and the characteristic impedances (Z1, Z2, Z3).

Figure 17:
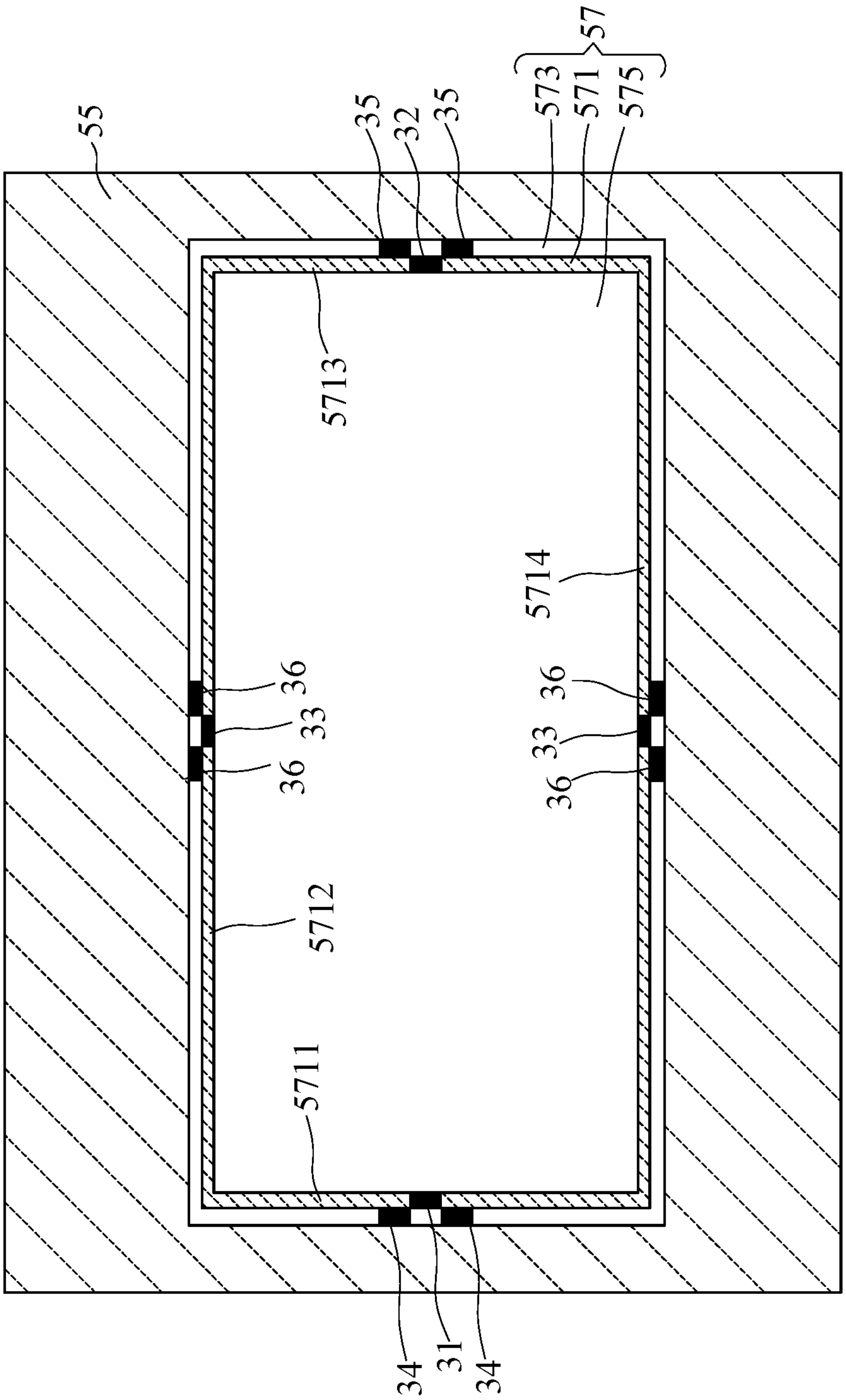
FIG. 17 is a structural bottom view of a filter device according to another embodiment of the present invention.

Referring to FIG. 17, there is shown a structural bottom view of a filter device according to another embodiment of the present invention, and also referring to FIG. 7, FIG. 12, and FIG. 13 at the same time. Comparing to the filter device 501 in FIG. 16, the filter device 502 in FIG. 17 further comprises at least one fourth impedance 34, at least one fifth impedance 35, and at least one sixth impedance 36. The fourth impedance 34, the fifth impedance 35, and the sixth impedance 36 are disposed in the slotted portion 573. The left end or the right end of the first impedance unit 31 is connected to the first reference conductor 55 via the fourth impedance unit 34. The left end or the right end of the second impedance unit 32 is connected to the first reference conductor 55 via the fifth impedance unit 35. The left end or the right end of the third impedance unit 33 is connected to the first reference conductor 55 via the sixth impedance unit 36. The equivalent filter circuit 204 of FIG. 7 may be equivalently formed by the filter device 502 in FIG. 17. The fourth impedance units 34, the fifth impedance units 35, and the sixth impedance units 36 of the filter device 502 are equivalent to the fourth impedance units 34, the fifth impedance units 35, and the sixth impedance units 36 in the equivalent filter circuit 204 of FIG. 7. In the equivalent filter circuit 204 of FIG. 7 and the filter device 502 of FIG. 17, the first impedance unit 31 and the fourth impedance units 34 located at two sides of the first impedance unit 31, the second impedance unit 32 and the fifth impedance unit 35 located at two sides of the second impedance unit 32, and the third impedance unit 33 and the sixth impedance unit 36 located at two sides of the third impedance unit 33 will form a x-shaped impedance assembly unit, respectively.

Figure 18:
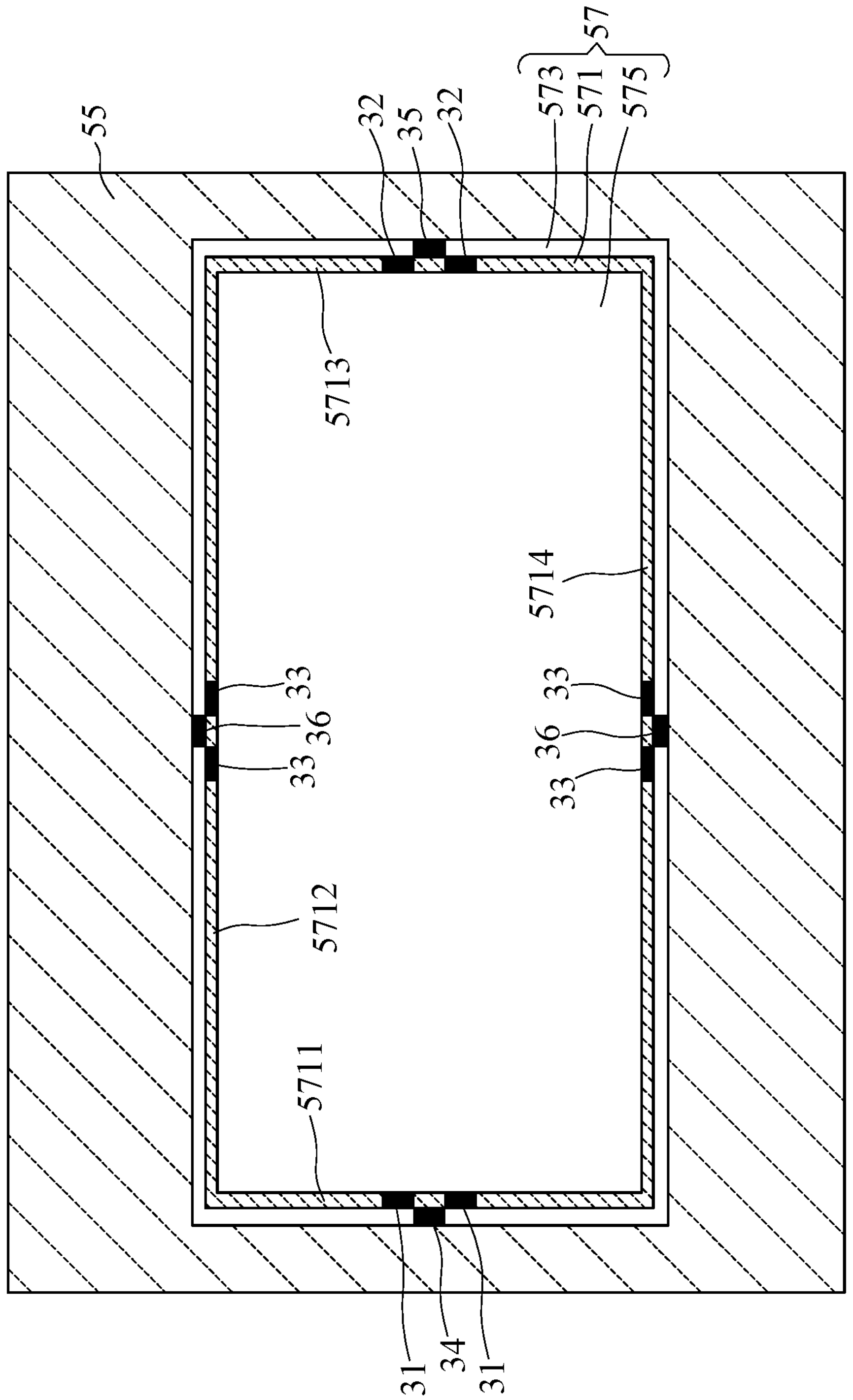
FIG. 18 is a structural bottom view of a filter device according to another embodiment of the present invention.

Referring to FIG. 18, there is shown a structural bottom view of a filter device according to another embodiment of the present invention, and also referring to FIG. 9, FIG. 12, and FIG. 13 at the same time. In the filter device 503 of FIG. 18, two or more than two first impedance units 31 are disposed on the first side 5711 of the frame portion 571, two or more than two second impedance units 32 are disposed on the third side 5713 of the frame portion 571, and two or more than two third impedance units 33 are disposed on the second side 5712 or the fourth sides 5714 of the frame portion 571. Each of the fourth impedance units 34 is connected at one end thereof between two adjacent first impedance units 31, and connected at the other end thereof to the first reference conductor 55. Each of the fifth impedance units 35 is connected at one end thereof between two adjacent second impedance units 32, and connected at the other end thereof to the first reference conductor 55. Each of the sixth impedance units 36 is connected at one end thereof between two adjacent third impedance units 33, and connected at the other end thereof to the first reference conductor 55. The equivalent filter circuit 206 in FIG. 9 may be equivalently formed by the filter device 503 in FIG. 18. In the equivalent filter circuit 206 of FIG. 9 and the filter device 503 of FIG. 18, the two first impedance units 31 and the fourth impedance unit 34 connected between the two first impedance units 31, the two second impedance units 32 and the fifth impedance unit 35 connected between the two second impedance units 32, and the two third impedance units 33 and the sixth impedance unit 36 connected between the two third impedance units 33 will form a T-shaped impedance assembly unit, respectively.

Figure 19:
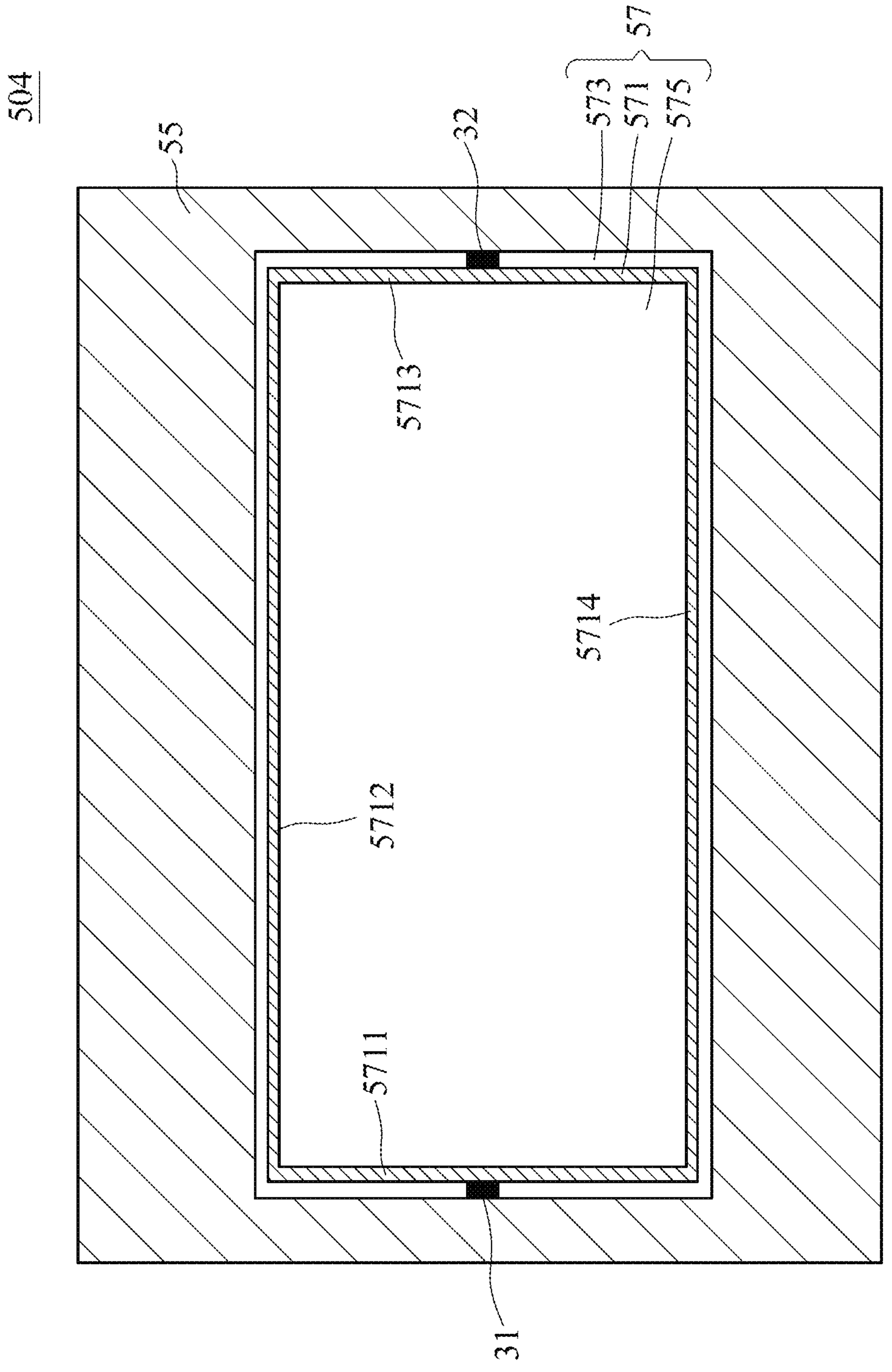
FIG. 19 is a structural bottom view of a filter device according to another embodiment of the present invention.

Referring to FIG. 19, there is shown a structural bottom view of a filter device according to another embodiment of the present invention, and also referring to FIG. 10, FIG. 12, and FIG. 13 at the same time. The equivalent filter circuit 207 in FIG. 10 may be equivalently formed by the filter device 504 in FIG. 19. Comparing to the filter device 500 in FIG. 14 where the first impedance unit 31 and the second impedance unit 32 are disposed on the frame portion 571, the first impedance unit 31 and the second impedance unit 32 of the filter device 504 in FIG. 19 are disposed in the slotted portion 573. Besides, the first side 5711 of the frame portion 571 is connected to the first reference conductor 55 via the first impedance unit 31, and the third side 5713 of the frame portion 571 is connected to the first reference conductor 55 via the second impedance unit 32.

Figure 20:
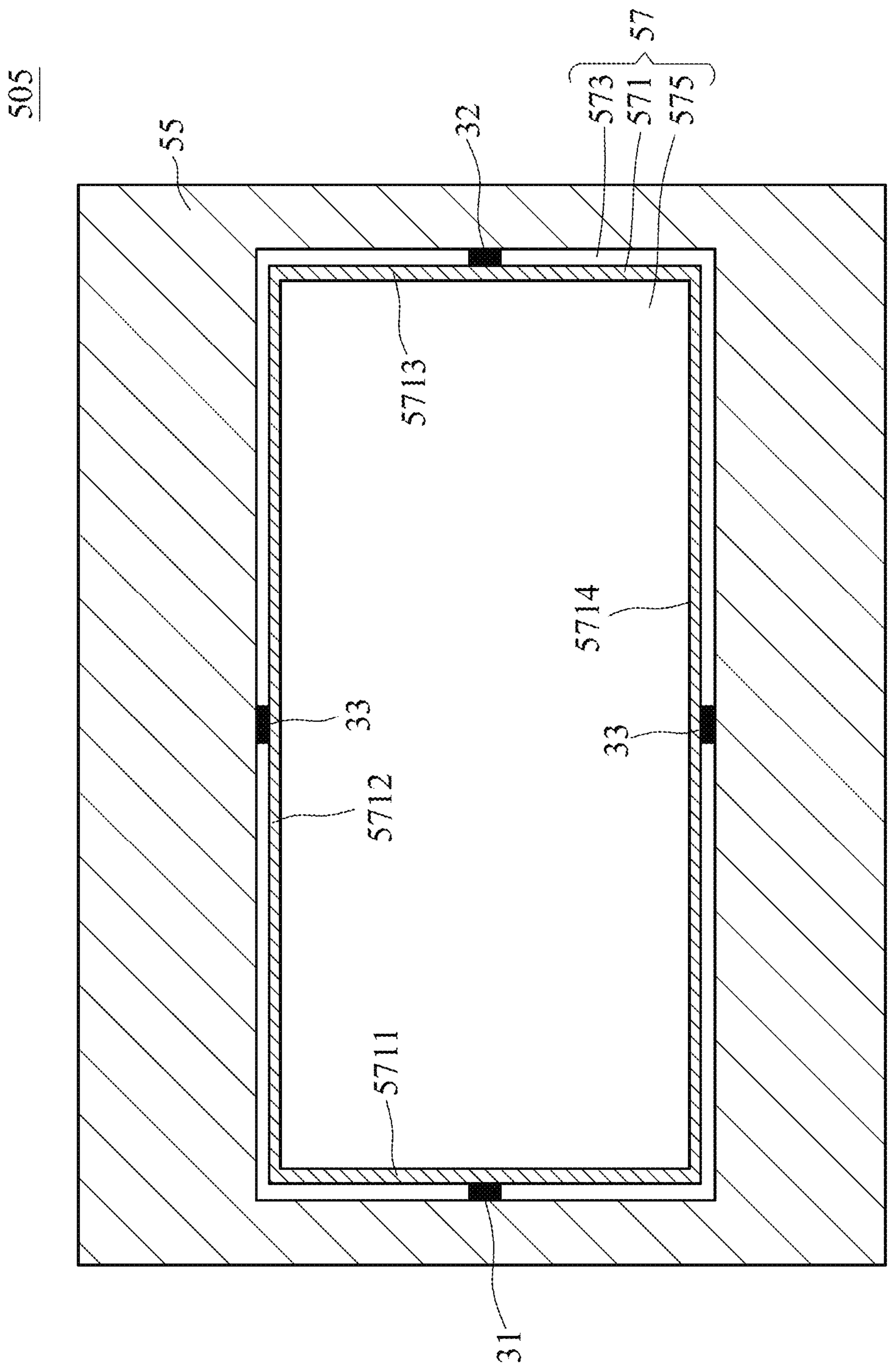
FIG. 20 is a structural bottom view of a filter device according to another embodiment of the present invention.

Referring to FIG. 20, there is shown a structural bottom view of a filter device according to another embodiment of the present invention, and also referring to FIG. 11, FIG. 12, and FIG. 13 at the same time. The equivalent filter circuit 208 in FIG. 11 may be equivalently formed by the filter device 505 in FIG. 20. Comparing to the filter device 504 in FIG. 19, the filter device 505 in FIG. 20 further comprises at least one third impedance unit 33. The third impedance unit 33 is disposed in the slotted portion 573. The second side 5712 of the frame portion 571 is connected to the first reference conductor 55 via the third impedance unit 33, or the fourth side 5714 of the frame portion 571 is connected to the first reference conductor 55 via the third impedance unit 33.

Figure 21:
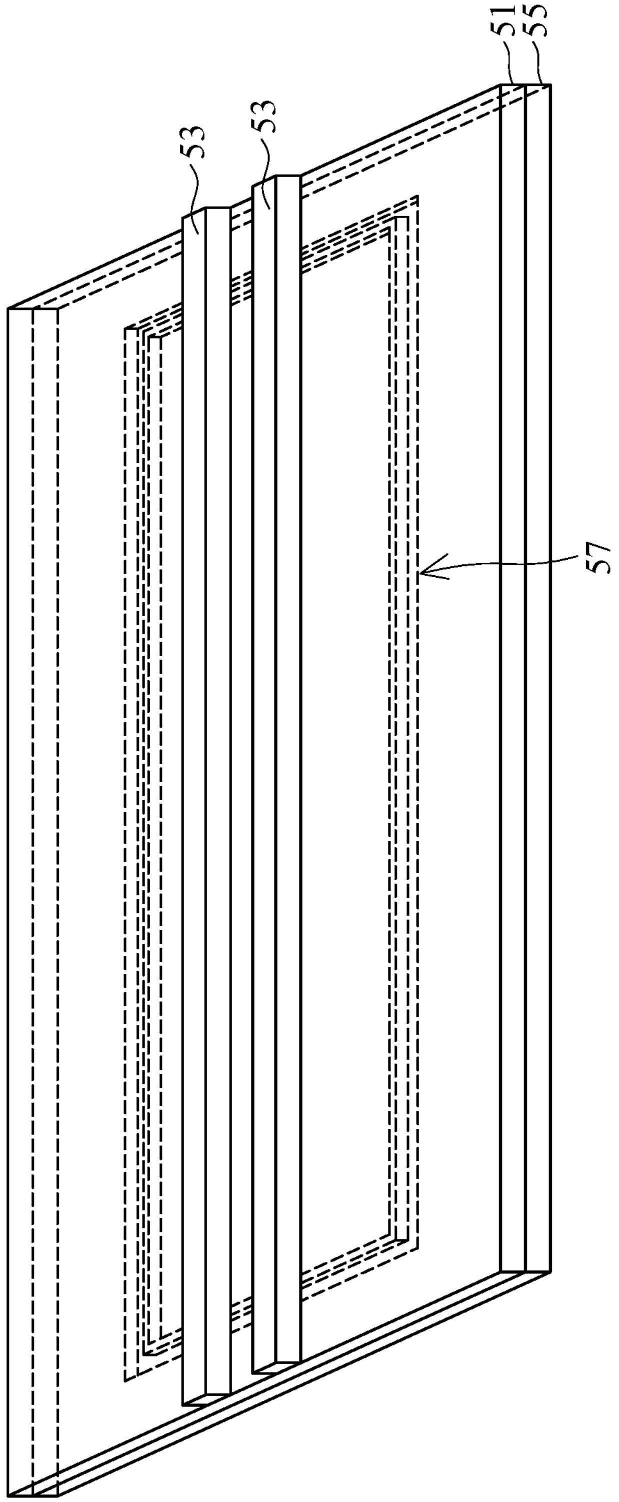
FIG. 21 is a three-dimensional structural perspective view of a filter device according to another embodiment of the present invention.
Figure 22:
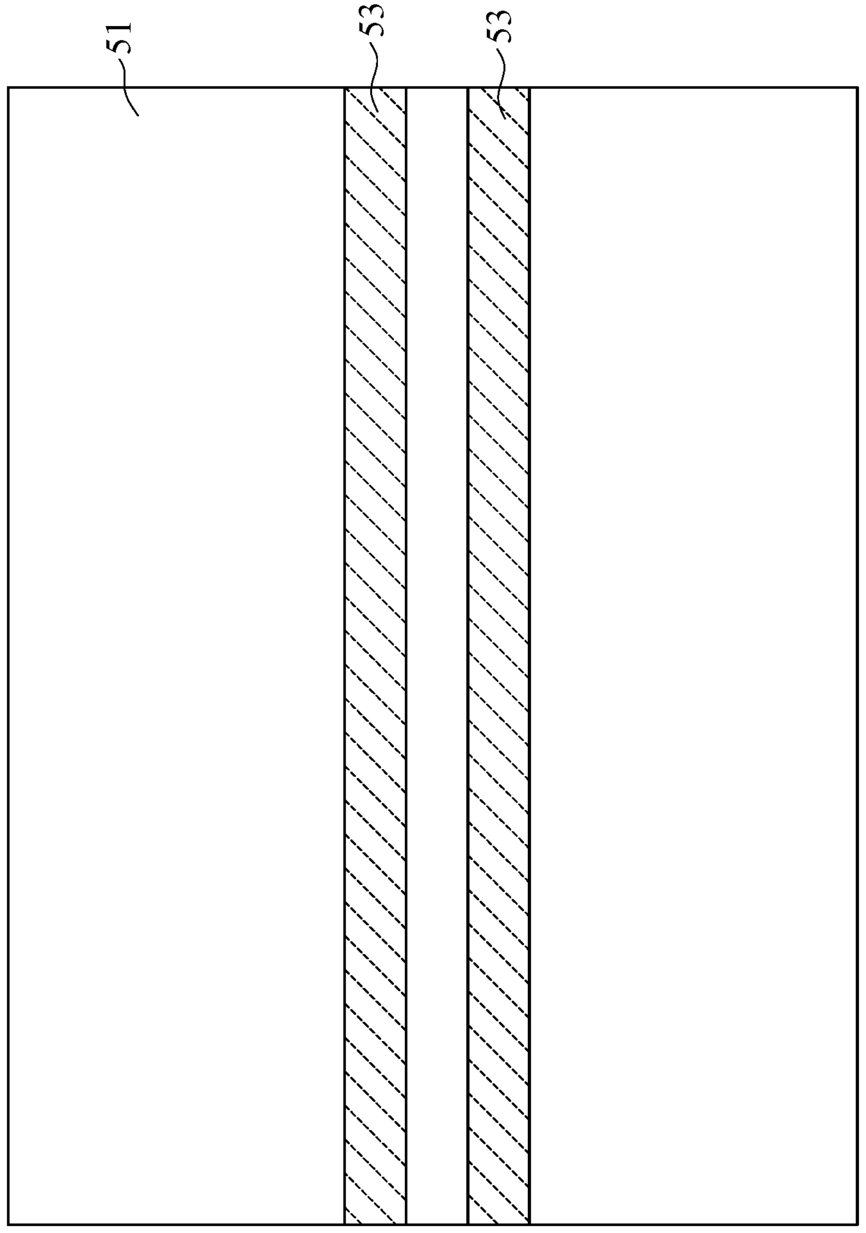
FIG. 22 is a structural top view of a filter device according to another embodiment of the present invention.

Referring to FIG. 21 and FIG. 22, there are shown a three-dimensional structural perspective view and a structural top view of a filter device according to another embodiment of the present invention. In the present embodiment, the number of transmission conductors 53 of the filter device 500/501/502/503/504/505 (FIGS. 21 and 22) can be two. The two transmission conductors 53 are formed as a pair of differential transmission conductors. A differential mode signal or a common mode signal can be transmitted on the differential transmission conductors. The differential mode signal is a data signal, and the common signal is a common mode noise. The filter device 500/501/502/503/504/505 can be used to absorb the common mode noise by one or more impedance units 31, 32, 33, 34, 35, and/or 36 (FIGS. 17 and 18) to prevent that the common mode noise affects the transmission quality of the differential mode signal.

Figure 23:
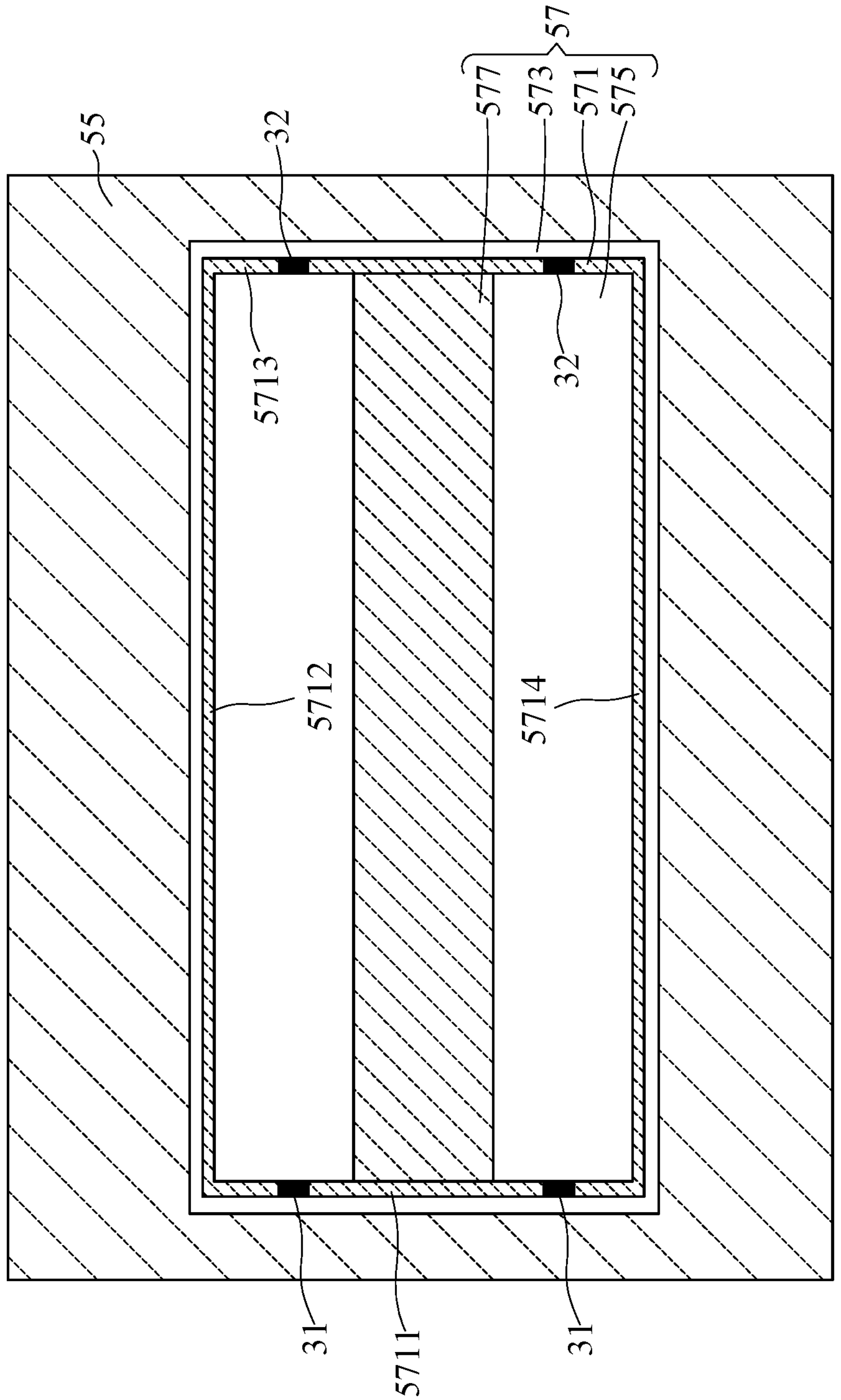
FIG. 23 is a structural bottom view of a filter device according to another embodiment of the present invention.

Referring to FIG. 23, there is shown a structural bottom view of a filter device according to another embodiment of the present invention. In the filter device 500 of the present embodiment, the slotted structure 57 further comprises a second reference conductor 577. The second reference conductor 577 is configured in the hollow portion 575 based on the position of the transmission conductors 53. For example, the second reference conductor 577 is located directly below the transmission conductors 53. A capacitive coupling effect between the transmission conductors 53 and the slotted structure 57 can be increased by the configuration of the second reference conductor 577 so that the signal passing through the filter device 500 can obtain a better impedance matching so as to achieve better signal quality. In the present embodiment, the first impedance units 31 and the second impedance units 32 are disposed on the frame portion 571 located at the both sides of the second reference conductor 577, and directly connected with the frame portion 571, as shown in FIG. 14A; otherwise, the first impedance units 31 and the second impedance units 32 are disposed on the frame portion 571 located at the both sides of the second reference conductor 577, and connected with the frame portion 571 via the conductive via holes 591, as shown in FIG. 14B.

Of course, in addition to the filter device 500, other filter device 501, 502, 503, 504 or 505 can also configure the second reference conductor 577 in the hollow portion 575 of the slotted structure 57 in order to increase the capacitive coupling effect between the transmission conductors 53 (FIGS. 12, 13, 21, and 22) and the slotted structure 57.

The above disclosure is only the preferred embodiment of the present invention, and not used for limiting the scope of the present invention. All equivalent variations and modifications on the basis of shapes, structures, features and spirits described in the claims of the present invention should be included in the claims of the present invention.

What is claimed is:

1. An equivalent filter circuit, comprising:

at least one first equivalent transmission line model, comprising:

a first master transmission conductor, connected at a left end thereof to a signal input port, and connected at a right end thereof to a signal output port; and a first slave transmission conductor;

at least one second equivalent transmission line model, comprising:

a second master transmission conductor connected at a left end and a right end thereof to a reference potential; and a second slave transmission conductor connected at a right end thereof to a right end of the first slave transmission conductor; and at least one first impedance unit connected between a left end of the first slave transmission conductor and a left end of the second slave transmission conductor in series.

2. The equivalent filter circuit according to claim 1, wherein at least one second impedance unit is connected between the right end of the first slave transmission conductor and the right end of the second slave transmission conductor in series.

3. The equivalent filter circuit according to claim 1, wherein the equivalent filter circuit comprises at least one third equivalent transmission line model, the least one third equivalent transmission line model comprises a third master transmission conductor and a third slave transmission conductor, the left end of the second master transmission conductor is connected to the reference potential via the third master transmission conductor, the third slave transmission conductor and the at least one first impedance unit are connected between the left end of the first slave transmission conductor and the left end of the second slave transmission conductor in series.

4. The equivalent filter circuit according to claim 3, wherein at least one third impedance unit is connected between the left end of the first slave transmission conductor and a left end of the third slave transmission conductor in series.

5. The equivalent filter circuit according to claim 4, wherein at least one second impedance unit is connected between the right end of the first slave transmission conductor and the right end of the second slave transmission conductor in series.

6. The equivalent filter circuit according to claim 3, wherein the first master transmission conductor and the first slave transmission conductor are coupled to generate a first characteristic impedance and a first electrical length; the second master transmission conductor and the second slave transmission conductor are coupled to generate a second characteristic impedance and a second electrical length; the third master transmission conductor and the third slave transmission conductor are coupled to generate a third characteristic impedance and a third electrical length; the first characteristic impedance, the second characteristic impedance, and the third characteristic impedance are of the same impedance value or the different impedance values; the first electrical length, the second electrical length, and the third electrical length are of the same electrical length or the different electrical lengths.

7. The equivalent filter circuit according to claim 1, wherein at least one fourth impedance unit is connected between a right end of the first impedance unit and the left end of the second master transmission conductor, or the at least one fourth impedance unit is connected between a left end of the first impedance unit and the left end of the second master transmission conductor.

8. The equivalent filter circuit according to claim 7, wherein the equivalent filter circuit comprises at least one third equivalent transmission line model; the least one third equivalent transmission line model comprises a third master transmission conductor and a third slave transmission conductor; the left end of the second master transmission conductor is connected to the reference potential via the third master transmission conductor; at least one third impedance unit, the third slave transmission conductor, and the at least one first impedance unit are connected between the left end of the first slave transmission conductor and the left end of the second slave transmission conductor in series; at least one sixth impedance unit is connected between a right end of the third impedance unit and the reference potential, or the at least one sixth impedance unit is connected between a left end of the third impedance unit and the reference potential.

9. The equivalent filter circuit according to claim 8, wherein at least one second impedance unit is connected between the right end of the first slave transmission conductor and the right end of the second slave transmission conductor in series, at least one fifth impedance unit is connected between a right end of the at least one second impedance unit and the reference potential in series, or the at least one fifth impedance unit is connected between a left end of the at least one second impedance unit and the reference potential in series.

10. The equivalent filter circuit according to claim 7, wherein at least one second impedance unit is connected between the right end of the first slave transmission conductor and the right end of the second slave transmission conductor in series, at least one fifth impedance unit is connected between right end of the at least one second impedance unit and the reference potential, or the at least one fifth impedance unit is connected between a left end of the at least one second impedance unit and the reference potential.

11. The equivalent filter circuit according to claim 1, further comprising one or more fourth impedance units and comprising a plurality of the first impedance units; wherein each of the fourth impedance units is connected at one end thereof between the two adjacent first impedance units, and connected at other end thereof to the second master transmission conductor.

12. The equivalent filter circuit according to claim 11, wherein the equivalent filter circuit comprises at least one third equivalent transmission line model; the least one third equivalent transmission line model comprises a third master transmission conductor and a third slave transmission conductor; the left end of the second master transmission conductor is connected to the reference potential via the third master transmission conductor; a plurality of third impedance units, the third slave transmission conductor, and the at least one first impedance unit are connected between the left end of the first slave transmission conductor and the left end of the second slave transmission conductor in series; the equivalent filter circuit further comprises one or more sixth impedance units, each of the sixth impedance units is connected at one end thereof between the two adjacent third impedance units, and connected at other end thereof to the reference potential.

13. The equivalent filter circuit according to claim 12, wherein a plurality of second impedance units are connected between the right end of the first slave transmission conductor and the right end of the second slave transmission conductor in series; the equivalent filter circuit further comprises one or more fifth impedance unit, each of the fifth impedance units is connected at one end thereof between the two adjacent second impedance units, and connected at other end thereof to the reference potential.

14. The equivalent filter circuit according to claim 11, wherein a plurality of second impedance units are connected between the right end of the first slave transmission conductor and the right end of the second slave transmission conductor in series; the equivalent filter circuit further comprises one or more fifth impedance unit, each of the fifth impedance units is connected at one end thereof between the two adjacent second impedance units, and connected at other end thereof to the reference potential.

15. The equivalent filter circuit according to claim 1, wherein the equivalent filter circuit comprises the two first equivalent transmission line models and the two second equivalent transmission line models; the left ends of the second slave transmission conductors of the two first equivalent transmission line models are connected together via the at least one corresponding first impedance unit, and the right ends of the second slave transmission conductors of the two first equivalent transmission line models are directly connected together.

16. A filter device, comprising:

a substrate;

at least one transmission conductor configured on a first surface of the substrate; and a first reference conductor, configured on a second surface of the substrate, and comprising a slotted structure, the slotted structure comprising:

a frame portion;

a slotted portion surrounding the frame portion; and a hollow portion formed in the frame portion;

wherein the frame portion comprises at least one notch, at least one first impedance unit is disposed in the at least one notch, and parts of the frame portion at both ends of the at least one notch are connected through the at least one first impedance unit.

17. The filter device according to claim 16, wherein the number of the transmission conductors is two to form a pair of differential transmission conductors.

18. The filter device according to claim 16, further comprising at least one fourth impedance unit, wherein the at least one fourth impedance unit is disposed in the slotted portion, the at least one first impedance unit is connected at a left end or a right end thereof to the first reference conductor via the at least one fourth impedance unit.

19. The filter device according to claim 16, further comprising one or more fourth impedance units disposed in the slotted portion, wherein each of the fourth impedance units is connected at one end thereof between the two adjacent first impedance units, and connected at other end thereof to the first reference conductor.

20. The filter device according to claim 16, wherein the slotted structure further comprises a second reference conductor, wherein the second reference conductor is configured in the hollow portion based on the position of the at least one transmission conductor.

21. The filter device according to claim 16, wherein the frame portion is a quadrilateral frame and comprises a first side, a second side, a third side, and a fourth side; the first side and the third side are parallel to each other, and the second side and the fourth side are parallel to each other and perpendicular to the first side and the third side; the at least one transmission conductor configured on the first surface of the substrate partially overlaps the first side and the third side of the frame portion configured on the second surface of the substrate.

22. The filter device according to claim 21, further comprising at least one third impedance unit, wherein the at least one third impedance unit is disposed on the second side or the fourth side of the frame portion.

23. The filter device according to claim 22, further comprising at least one fourth impedance unit and at least one sixth impedance unit, wherein the at least one fourth impedance unit and the at least one sixth impedance unit are disposed in the slotted portion, the first impedance unit is connected at a left end or a right end thereof to the first reference conductor via the at least one fourth impedance unit, and the third impedance unit is connected at a left end or a right end thereof to the first reference conductor via the at least one sixth impedance unit.

24. The filter device according to claim 22, further comprising one or more fourth impedance units and one or more sixth impedance units; wherein the one or more fourth impedance units and the one or more sixth impedance units are disposed in the slotted portion; each of the fourth impedance units is connected at one end thereof between the two adjacent first impedance units, and connected at other end thereof to the first reference conductor, and each of the sixth impedance units is connected at one end thereof between the two adjacent third impedance units, and connected at other end thereof to the first reference conductor.

25. The filter device according to claim 21, further comprising at least one second impedance unit, wherein the at least one first impedance unit is disposed on the first side of the frame portion based on the position of the at least one transmission conductor, and the at least one second impedance unit is disposed on the third side of the frame portion based on the position of the at least one transmission conductor.

26. The filter device according to claim 25, further comprising at least one third impedance unit, wherein the at least one third impedance unit is configured on the second side or the fourth side of the frame portion.

27. The filter device according to claim 26, further comprising at least one fourth impedance unit, at least one fifth impedance unit, and at least one sixth impedance unit; wherein the at least one fourth impedance unit, the at least one fifth impedance unit, and the at least one sixth impedance unit are disposed in the slotted portion; the first impedance unit is connected at a left end or a right end thereof to the first reference conductor via the at least one fourth impedance unit, the second impedance unit is connected at a left end or a right end thereof to the first reference conductor via the at least one fifth impedance unit, and the third impedance unit is connected at a left end or a right end thereof to the first reference conductor via the at least one sixth impedance unit.

28. The filter device according to claim 26, further comprising one or more fourth impedance units, one or more fifth impedance units, and one or more sixth impedance units; wherein the one or more fourth impedance units, the one or more fifth impedance units, and the one or more sixth impedance units are disposed in the slotted portion; each of the fourth impedance units is connected at one end thereof between the two adjacent first impedance units, and connected at other end thereof to the first reference conductor, each of the fifth impedance units is connected at one end thereof between the two adjacent second impedance units, and connected at other end thereof to the first reference conductor, and each of the sixth impedance units is connected at one end thereof between the two adjacent third impedance units, and connected at other end thereof to the first reference conductor.

29. The filter device according to claim 25, further comprising at least one fourth impedance unit and at least one fifth impedance unit, wherein the at least one fourth impedance unit and the at least one fifth impedance unit are disposed in the slotted portion, the first impedance unit is connected at a left end or a right end thereof to the first reference conductor via the at least one fourth impedance unit, and the second impedance unit is connected at a left end or a right end thereof to the first reference conductor via the at least one fifth impedance unit.

30. The filter device according to claim 25, further comprising one or more fourth impedance units and one or more fifth impedance units; wherein the one or more fourth impedance units and the one or more fifth impedance units are disposed in the slotted portion; each of the fourth impedance units is connected at one end thereof between the two adjacent first impedance units, and connected at other end thereof to the first reference conductor, and each of the fifth impedance units is connected at one end thereof between the two adjacent second impedance units, and connected at other end thereof to the first reference conductor.

* * * * *